(12) United States Patent
Berg et al.

(10) Patent No.: US 7,769,747 B2
(45) Date of Patent: Aug. 3, 2010

(54) METHOD AND APPARATUS FOR GENERATING A SERVICE DATA OBJECT BASED SERVICE PATTERN FOR AN ENTERPRISE JAVA BEANS MODEL

(75) Inventors: Daniel Christopher Berg, Cary, NC (US); Narinder Makin, Morrisville, NC (US); Lawrence Scott Rich, Cary, NC (US); Ritchard Leonard Schacher, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 11/001,864

(22) Filed: Dec. 2, 2004

(65) Prior Publication Data

US 2006/0122971 A1 Jun. 8, 2006

(51) Int. Cl.
G06F 17/30 (2006.01)

(52) U.S. Cl. .................. 707/716; 707/610; 707/706; 707/713; 707/722; 707/736; 707/758; 707/791; 707/822; 707/640; 707/611; 707/674; 709/201

(58) Field of Classification Search .............. 709/201; 707/610, 706, 713, 722, 736, 758, 791, 822, 707/640, 661, 674
See application file for complete search history.

(56) References Cited

U.S. PATENT DOCUMENTS

| | | | |
|---|---|---|---|
| 5,446,886 A | 8/1995 | Li | |
| 5,721,900 A | 2/1998 | Banning et al. | |
| 6,266,666 B1 * | 7/2001 | Ireland et al. | 707/10 |
| 6,341,277 B1 | 1/2002 | Coden et al. | |
| 6,539,396 B1 | 3/2003 | Bowman-Amuah | 707/103 |
| 6,574,639 B2 | 6/2003 | Carey et al. | |
| 6,609,123 B1 | 8/2003 | Cazemier et al. | |
| 6,618,732 B1 | 9/2003 | White et al. | |
| 6,675,227 B1 | 1/2004 | Gavrilo et al. | 709/316 |
| 6,690,820 B2 | 2/2004 | Lees et al. | |
| 6,850,927 B1 | 2/2005 | Hsu | |
| 6,957,214 B2 | 10/2005 | Silberberg et al. | |
| 6,999,956 B2 | 2/2006 | Mullins | |
| 7,103,600 B2 * | 9/2006 | Mullins | 707/10 |
| 7,222,333 B1 | 5/2007 | Mor et al. | |
| 2002/0049788 A1 * | 4/2002 | Lipkin et al. | 707/513 |
| 2003/0018701 A1 * | 1/2003 | Kaestle et al. | 709/201 |
| 2003/0046673 A1 | 3/2003 | Copeland et al. | |

(Continued)

OTHER PUBLICATIONS

John Beatty et al. Service Data Objects IBM Corp. and BEA Systems, Inc. Version 1.0 Nov. 2003 p. 1-39.*

(Continued)

Primary Examiner—Khanh B Pham
Assistant Examiner—Syling Yen
(74) Attorney, Agent, or Firm—Joseph E. Bracken; Law Office of Jim Boice

(57) ABSTRACT

A method and apparatus for generating a service data object based service pattern for an EJB model is provided. Definitions of session bean façade, SDOs, and queries are defined in entity beans. When the definitions are processed, SDOs, related SDOs, and queries for SDOs are added to the session bean façade. At run time, a client may manipulate the SDOs and apply changes to the SDOs via a mediator obtained from a mediator cache. The mediator persists the SDOs to a data graph without interfering the entity bean.

21 Claims, 25 Drawing Sheets

U.S. PATENT DOCUMENTS

| | | | |
|---|---|---|---|
| 2003/0051063 A1* | 3/2003 | Skufca et al. | 709/310 |
| 2003/0135509 A1* | 7/2003 | Davis et al. | 707/100 |
| 2003/0182307 A1* | 9/2003 | Chen et al. | 707/103 X |
| 2004/0015506 A1 | 1/2004 | Anonsen et al. | |
| 2004/0054569 A1* | 3/2004 | Pombo et al. | 705/7 |
| 2004/0060007 A1 | 3/2004 | Gottlob et al. | |
| 2004/0158549 A1 | 8/2004 | Matena et al. | 707/1 |
| 2005/0066338 A1 | 3/2005 | Bloesch et al. | |
| 2006/0061595 A1 | 3/2006 | Goede et al. | |
| 2007/0192336 A1 | 8/2007 | Iyer et al. | |

OTHER PUBLICATIONS

Beatty et al., "Service Data Objects", IBM Corp. and Bea Systems, Inc., Version 1.0, Nov. 2003. pp. 1-39.

"Core J2EE Patterns—Session Façade", Sun Microsystems, Inc., http://java.sun.com/blueprints/corej2eepatterns/Patterns/SessionFacade.html, 12 pages.

"Core J2EE Patterns—Transfer Object", Sun Microsystems, Inc., http://java.sun.com/jsp_utils/PrintPage.jsp?url=http%3A%2F%2Fjava.sun.com%2Fblueprints%2Fcorej2..., 20 pages.

"Core J2EE Patterns—Data Access Object", Sun Microsystems, Inc., http://java.sun.com/blueprints/corej2eepatterns/Patterns/DataAccessObject.html, 13 pages.

Berg et al., Method and Apparatus for Annotation-Based Behavior Extensions, Dec. 2, 2004.

Berg et al., Method and Apparatus for Incrementally Processing Program Annotations, Dec. 2, 2004.

Berg et al., Mechanism for Defining Queries in Terms of Data Objects, Dec. 2, 2004.

* cited by examiner

```
public class EmployeeData extends AbstractEntityData { private java.lang.Integer ssn;
402     private boolean isssnDirty = false;
        private java.lang.String lastName;
        private boolean islastNameDirty = false;
        private java.lang.String firstName;
        private boolean isfirstNameDirty = false;
        private java.lang.String middleInit;
        private boolean ismiddleInitDirty = false;

public boolean getIsssnDirty() {
                return this.isssnDirty;
        }
        public java.lang.Integer getSsn() {
                return this.ssn;
        }
        public void setSsn(java.lang.Integer value) {
                this.ssn = value;
                this.isssnDirty = true;
                this.isDirty = true;
        }
        public boolean getIslastNameDirty() {
                return this.islastNameDirty;
        } public java.lang.String getLastName() {
                return this.lastName;
        }
        public void setLastName(java.lang.String value) {
                this.lastName = value;
                this.islastNameDirty = true;
                this.isDirty = true;
        }
        public boolean getIsfirstNameDirty() {
                return this.isfirstNameDirty;
        }
        public java.lang.String getFirstName() {
                return this.firstName;
        }
```

FIG. 4B

```java
public void setFirstName(java.lang.String value) {
        this.firstName = value;
        this.isfirstNameDirty = true;
        this.isDirty = true;
}
public boolean getIsmiddleInitDirty() {
        return this.ismiddleInitDirty;
} public java.lang.String getMiddleInit() {
        return this.middleInit;
}
public void setMiddleInit(java.lang.String value) {
        this.middleInit = value;
        this.ismiddleInitDirty = true;
        this.isDirty = true;
public interface Store extends AbstractEntityData.Store { public java.lang.Integer getSsn();
                public void setSsn(java.lang.Integer value);
                public java.lang.String getLastName();
                public void setLastName(java.lang.String value);
                public java.lang.String getFirstName();
                public void setFirstName(java.lang.String value);
                public java.lang.String getMiddleInit();
                public void setMiddleInit(java.lang.String value);
        }
        public EmployeeData() {
                super();
        } public EmployeeData(EmployeeData.Store initializer) {
                super(initializer);
                initialize(initializer);
        }
                                   404
        protected void initialize(EmployeeData.Store initializer) {
                this.ssn = initializer.getSsn();
                this.lastName = initializer.getLastName();
                this.firstName = initializer.getFirstName();
                this.middleInit = initializer.getMiddleInit();
        }
```

```
public void copyTo(EmployeeData.Store target) {
        if (!this.isDirty)
                return;
        if (this.isssnDirty)
                target.setSsn(this.ssn);
        if (this.islastNameDirty)
                target.setLastName(this.lastName);
        if (this.isfirstNameDirty)
                target.setFirstName(this.firstName);
        if (this.ismiddleInitDirty)
                target.setMiddleInit(this.middleInit);
    }
}
```

FIG. 5

```
                                500
public abstract class EmployeeBean implements javax.ejb.EntityBean, ejbs.dept.EmployeeData.Store {
        public ejbs.dept.EmployeeData getEmployeeData() { 502
                return new ejbs.dept.EmployeeData(this);
        }       504
        public void setEmployeeData(ejbs.dept.EmployeeData data)
                throws com.ibm.etools.ejb.client.runtime.FieldChangedException {
                data.copyTo(this);
                if (!data.getIsssnDirty()) {
                        if (this.getSsn() != null && data.getSsn() != null) {
                                if (!this.getSsn().equals(data.getSsn())) {
                                        throw new FieldChangedException();
                                }
                        } else if (!(this.getSsn() == null && data.getSsn() == null)) {
                                throw new FieldChangedException();
                        }
                }
                if (!data.getIslastNameDirty()) {
                        if (this.getLastName() != null && data.getLastName() != null) {
                                if (!this.getLastName().equals(data.getLastName())) {
                                        throw new FieldChangedException();
                                }
                        } else if (
                                !(this.getLastName() == null && data.getLastName() == null)) {
                                throw new FieldChangedException();
                        }
                }
                if (!data.getIsfirstNameDirty()) {
                        if (this.getFirstName() != null && data.getFirstName() != null) {
                                if (!this.getFirstName().equals(data.getFirstName())) {
                                        throw new FieldChangedException();
                                }
                        } else if (
                                !(this.getFirstName() == null
                                        && data.getFirstName() == null)) {
                                throw new FieldChangedException();
                        }
                }
                if (!data.getIsmiddleInitDirty()) {
                        if (this.getMiddleInit() != null && data.getMiddleInit() != null) {
                                if (!this.getMiddleInit().equals(data.getMiddleInit())) {
                                        throw new FieldChangedException();
                                }
                        } else if (
                                !(this.getMiddleInit() == null
                                        && data.getMiddleInit() == null)) {
                                throw new FieldChangedException();
                        }
                }
        }       506
        public ejbs.dept.EmployeeData syncEmployeeData(
                ejbs.dept.EmployeeData data) {
                data.copyTo(this);
                return this.getEmployeeData();
        }
}
```

602
```
public void updateEmployee(EmployeeData data) {
        EmployeeLocal employee = null;
        try {                     604
                employee = getEmployeeHome().findByPrimaryKey(data.getSsn());
        } catch (FinderException e) {
                // TODO Auto-generated catch block
                e.printStackTrace();
        }
        if (employee != null)  606
                employee.syncEmployeeData(data);
}
```

604
```
private EmployeeLocalHome getEmployeeHome() {
        if (employeeHome == null) {
                try {
                        Context ctx = new InitialContext();
                        Object home = ctx.lookup("java:comp/env/ejb/Employee");
                        employeeHome = (EmployeeLocalHome) PortableRemoteObject.narrow(home, EmployeeLocalHome.class);
                } catch (ClassCastException e) {
                        // TODO Auto-generated catch block
                        e.printStackTrace();
                } catch (NamingException e) {
                        // TODO Auto-generated catch block
                        e.printStackTrace();
                }
        }
        return employeeHome;
}
```

FIG. 9A
900

EmployeeBean class
```
/**
 * @ws.sbf.session-facade                              ── 902
 *         name="EmployeeFacade"
 *         value-objects="Employee EmployeeLight" 903
 *     909 queries="FindEmployeesByStateDept"
 * @ws.sdo.value-object                                ── 904
 *         name="Employee"
 *     905 read-only="false"
 * @ws.sdo.value-object                                ── 906
 *         name="EmployeeLight"
 *     907 read-only="true"
 * @ws.sbf.query                                       ── 908
 *         name="FindEmployeesByStateDept" 910
 *         query="[select {$Employee} as e],
 *                [select in(e.department) as d where d.name = ?1],
 *                [select in(e.address) as a where a.state = ?2]"
 * Bean implementation class for Enterprise Bean: Employee
 */
public abstract class EmployeeBean implements javax.ejb.EntityBean {
    /**
     * @ws.sdo.value-object                            ── 912
     *         match="Employee"
     * Get accessor for persistent attribute: ssn
     */
    public abstract java.lang.Integer getSsn();
```

FIG. 9B

```
/**
 * @ws.sdo.value-object
 *         match="Employee"
 * @ws.sdo.value-object
 *    match="EmployeeLight"
 * Get accessor for persistent attribute: firstName
 */
public abstract java.lang.String getFirstName();
```
— 914

```
/**
 * @ws.sdo.value-object
 *         match="Employee"
 * @ws.sdo.value-object
 *    match="EmployeeLight"
 * Get accessor for persistent attribute: lastName
 */
public abstract java.lang.String getLastName();
```
— 919

```
/**
 * @ws.sdo.value-object
 *         match="Employee"
 * Get accessor for persistent attribute: middleInit
 */
public abstract java.lang.String getMiddleInit();
```
— 918

```
/**
 * @ws.sdo.value-object
 *         match="Employee"
 *         target-value-object="Department" 923
 *   924 contained="false"
 * This method was generated for supporting the relationship role named department.
 * It will be deleted/edited when the relationship is deleted/edited.
 */
public abstract ejbs.dept.DepartmentLocal getDepartment();
```
— 920

```
/**
 * @ws.sdo.value-object
 *         match="Employee"
 *         target-value-object="Address" 925
 *   929 contained="true"
 * This method was generated for supporting the relationship role named address.
 * It will be deleted/edited when the relationship is deleted/edited.
 */
public abstract ejbs.dept.AddressLocal getAddress();
}
```
— 922

DepartmentBean class

```
/**
 * @ws.sdo.value-object
 *       name="Department"
 *       read-only="false"  ← 1003
 * Bean implementation class for Enterprise Bean: Department
 */
public abstract class DepartmentBean implements javax.ejb.EntityBean {
    /**
     * @ws.sdo.value-object
     *       match="Department"
     * Get accessor for persistent attribute: name
     */
    public abstract java.lang.String getName();
    /**
     * @ws.sdo.value-object
     *       match="Department"
     * Get accessor for persistent attribute: id
     */
    public abstract java.lang.Integer getId();
    /**
     * @ws.sdo.value-object
     *       match="Department"
     *       target-value-object="Employee"   1010
     *       contained="false"   1012
     * This method was generated for supporting the relationship role named employees.
     * It will be deleted/edited when the relationship is deleted/edited.
     */
    public abstract java.util.Collection getEmployees();
}
```

1002 → lines for @ws.sdo.value-object name="Department" read-only="false"
1004 → getName() block
1006 → getId() block
1008 → getEmployees() block

AddressBean class

```
/**
 * @ws.sdo.value-object
 *       name="Address"
 *       read-only="false"   1104
 * Bean implementation class for Enterprise Bean: Address
 */
public abstract class AddressBean implements javax.ejb.EntityBean {
    ...
}
```

1102 → @ws.sdo.value-object name="Address" read-only="false"

FIG. 19

1900 public interface Employee extends DataObject{

Integer getSsn();
    void setSsn(Integer value);
    String getFirstName();
    void setFirstName(String value);
    String getLastName();
    void setLastName(String value);
    String getMiddleInit();
1902 —   void setMiddleInit(String value);
    Department getDepartment();
    void setDepartment(Department value);
    Address getAddress();
1904 —   void setAddress(Address value);
    Address createAddress();

}

1920 public interface Department extends DataObject{

String getName();
    void setName(String value);
    Integer getId();
    void setId(Integer value);
1922 —   List getEmployees();
    Employee[] getEmployeesAsArray();

```
public void updateEmployee(Employee data) throws UpdateException {
        try {
                doApplyChanges(data); 2002
        } catch (Exception ex) {
                throw new UpdateException(
                                "System error while updating \"Employee\".", ex);
        }
}
```

2002
```
private void doApplyChanges(DataObject dataObject) throws QueryException,
                MediatorMetaDataNotFoundException {
        mediatorCache.createMediator(dataObject).applyChanges(dataObject);
}                    2004
```

```
private MediatorMetaDataCache mediatorCache = new MediatorMetaDataCache() {
        protected MediatorMetaData createMediatorMetaData(EClassifier type) {
                switch (type.getClassifierID()) {    2006 case SdoPackage.EMPLOYEE_ROOT: 2008
                                return createEmployeeRootMediatorMetaData();
                        case SdoPackage.EMPLOYEE_LIGHT_ROOT:
                                return createEmployeeLightRootMediatorMetaData();
                        case SdoPackage.FIND_EMPLOYEES_BY_STATE_DEPT:
                                return createFindEmployeesByStateDeptMediatorMetaData();

}
                return null;
        }
};
```

FIG. 22

2102
private MediatorMetaData createEmployeeRootMediatorMetaData() {

String[] queryStrings = new String[3];
    int pattern = MediatorFactory.ROOT_CONTAINS_SOME;

2104
    queryStrings[0] = "select e.ssn, e.firstName, e.lastName, e.middleInit from Employee as e";
    queryStrings[1] = "select d.name, d.id from in(e.department) as d";
    queryStrings[2] = "select a.* from in(e.address) as a";
    SdoPackage pack = SdoPackage.eINSTANCE;

2106
    MediatorMetaData md = new MediatorMetaData(pack.getEmployeeRoot(),
                 queryStrings, pattern);
    md.addAbstractSchemaNameMapping("Employee", pack.getEmployee());

2108
    md.addAbstractSchemaNameMapping("Department", pack.getDepartment());
    md.addAbstractSchemaNameMapping("Address", pack.getAddress());
    return md;
}

2110
public Mediator createMediator() throws QueryException {
        if (abstractSchemaNameMap == null)     2112    2114
            return getFactory().createMediator(defaultQueryShape, null, rootType);
        else
2116        return getFactory().createMediator(defaultQueryShape, null, rootType, abstractSchemaNameMap, pattern);
    }

METHOD AND APPARATUS FOR GENERATING A SERVICE DATA OBJECT BASED SERVICE PATTERN FOR AN ENTERPRISE JAVA BEANS MODEL

CROSS REFERENCE TO RELATED APPLICATIONS

The present invention is related to the following applications entitled Method and Apparatus for Annotation-Based Behavior Extensions, Ser. No. 11/002,833, filed on Dec. 12, 2004; Mechanism for Defining Queries in Terms of Data Objects, Ser. No. 11/002,740, filed on Dec. 12, 2004; Method and Apparatus for Incrementally Processing Program Annotations, Ser. No. 11/002,845, filed on Dec. 12, 2004. All of the above related applications are assigned to the same assignee, and incorporated herein by reference.

BACKGROUND OF THE INVENTION

1. Technical Field

The present invention relates to an improved data processing system. In particular, the present invention relates to generating a service data object based service pattern for a J2EE Enterprise JavaBeans™ model in a data processing system. Still more particularly, the present invention relates to dynamically generating a service data object based service pattern for the J2EE Enterprise JavaBeans™ model by defining one or more service data objects for any container-managed persistent entity bean and generating a session façade bean that includes methods for operating on a data object graph.

2. Description of Related Art

In most enterprise application development environments, developers often use enterprise JavaBeans™ objects for modeling interactions between components and for managing data persistence in their applications. J2EE Enterprise JavaBeans™ is a specification available from Sun Microsystems, Inc. Examples of enterprise JavaBeans™ (EJB) objects include 'Entity' beans and 'Session' beans. Entity beans model the persistent data used by the EJB application and application clients. An Entity bean is a type of enterprise JavaBeans™ that persists data in a data source beyond the lifetime of the client application. Session beans are designed to execute a given task as requested by clients of the EJB interfaces. Often Session beans themselves are used to interact with the modeled Entity beans to perform some business logic.

However, the use of business objects introduces disadvantages, such as tight coupling between business components and data source implementation. This tight coupling makes it difficult to migrate client applications from one type of data source to another. Thus, business objects have to be updated to handle the new type of data source. Another problem is that it is not possible to operate on the data retrieved by an entity bean in a disconnected fashion since so many changes can be made and the updates could be performed in one transaction.

One solution to alleviate these problems is the use of data access objects to abstract and encapsulate all access to the data source. Data access objects (DAOs) hide implementation details from the client application. DAOs are transfer objects that return data and associated attribute values from the data source, such that the number of remote calls to the data source is minimized. DAOs also isolate client applications from the data store by providing disconnected access to persistent data. Furthermore, DAOs allow for defining "projections", of the underlying Entity EJBs. That is, the DAOs can represent "lightweight" objects comprised of a subset of the fields from the Entity beans, thus reducing the amount of data to be transferred in a remote call.

This solution meets the need of most small client applications. However, as the complexity of client applications and interactions between business objects increase, the use of data access objects is not by itself sufficient. Therefore, another solution, known as session bean façade, is introduced.

Session bean façade provides a single interface to client applications by hiding all complex interactions between business objects. Session bean façade not only manages relationships between business objects, it also manages life cycles of business objects by creating, locating, modifying, and deleting them as required by the workflow of the client applications.

Session bean façade provides a course grained method, or service, instead of exposing all the business objects or entity beans, to perform the required business function. For example, instead of directly invoking a getAddress method of the Employee class, a client application may invoke a getEmployeeAddress method in the session bean façade that invokes the getAddress method of the Employee class. Thus, knowledge of underlying business objects or business logic is not required for the client applications.

When the relationship between business components changes, new DAOs are defined and created. With the session bean façade, modification to the business objects or entity beans is necessary in order to include these newly created DAOs and methods for transfer of data. This modification affects the interface of the entity bean each time a new DAO is created, because the remote interface and the entity bean will have to be modified to include access specific code.

In addition, current implementations of the session bean façade only allow one entity bean definition per façade, which increases the number of façade definitions required. Thus, each time a DAO is updated, the client has to make a separate query to the session bean to update each DAO that is affected. This affects bandwidth performance, since each time the entity bean is modified, the entity bean is sent over the wire to the session bean façade. It is also expensive to serialize the entity bean for transfer between the client and the session bean façade.

Furthermore, no relationship attributes are currently maintained in the DAO to define relationships between entity beans. There is no synchronization of values of related DAOs. Thus, when one DAO is updated, the client has to make separate calls to update the related DAOs. Moreover, retrieving and loading of data in a data store is currently handled by the entity bean itself in the session bean façade.

Thus, a new type of data objects, known as service data objects (SDOs), is developed to address the deficiencies of DAOs. According to the service data object specification, available from International Business Machines Corporation and BEA Systems, herein incorporated by reference, service data objects (SDOs) are composed of data objects, which represent the data itself, and data graphs, which act as an envelope for data objects and track changes to the data objects. While SDOs have the advantage of persisting changes of data objects to a data source, no mechanism currently exists that takes advantage of SDOs in an EJB model to reflects changes in the entity beans. It is possible, in accordance with the SDO specification, to implement an "EJB Mediator", as is available in IBM WebSphere Application Server version 6.0.

Therefore, it would be advantageous to have an improved method and apparatus that generates a service data object (SDO) based service pattern for an enterprise JavaBeans™ model, such that relationships between SDOs are maintained.

BRIEF SUMMARY OF THE INVENTION

A method, apparatus, and computer instructions are provided for generating a service data object (SDO) based service pattern for an enterprise Java beans model. The present invention allows a client to define one or more service data objects for a container-managed persistent (CMP) entity bean and generating a session façade bean that includes methods for operating on one or more data object graphs. A client of the service pattern may define the session façade bean definitions, SDO definitions, and query definitions for service data objects.

When the definitions are processed at development time, SDOs representing value and query objects are generated and added to the session bean façade in the service pattern. The client may invoke methods in the session bean façade at runtime, to manipulate the SDOs and their related SDOs. A mediator is obtained or created for the given SDO type from a mediator meta data cache. When the client applies changes to a graph of SDOs, the mediator is used to persist the changed data in the data graph without accessing the entity beans themselves.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A is a diagram illustrating a known implementation of the Employee data object;

FIG. 4B is a diagram illustrating a known implementation of the Employee data object in continuation of FIG. 4A;

FIG. 4C is a diagram illustrating a known implementation of the Employee data object in continuation of FIG. 4A;

FIG. 5 is a diagram illustrating a known implementation of the Employee entity bean;

FIG. 6 is a diagram illustrating a known implementation of an update Employee method in a session bean façade;

FIG. 9A is a diagram illustrating an exemplary implementation of an Employee entity bean class in accordance with a preferred embodiment of the present invention;

FIG. 9B is a diagram illustrating an exemplary implementation of an Employee entity bean class in continuation of FIG. 9A in accordance with a preferred embodiment of the present invention;

FIG. 10 is a diagram illustrating an exemplary implementation of a Department entity bean class in accordance with a preferred embodiment of the present invention;

FIG. 11 is a diagram illustrating an exemplary implementation of an Address entity bean class in accordance with a preferred embodiment of the present invention;

FIG. 19 is a diagram illustrating an exemplary implementation of Employee SDO and Department SDO in accordance with a preferred embodiment of the present invention;

FIG. 20 is a diagram illustrating an exemplary implementation of Employee façade bean in accordance with a preferred embodiment of the present invention;

FIG. 22 is a diagram illustrating an exemplary implementation of method for initializing the MediatorMetaData for the EmployeeRoot root SDO in the EmployeeFaçade bean in accordance with a preferred embodiment of the present invention.

DETAILED DESCRIPTION OF THE INVENTION

Figure 1:
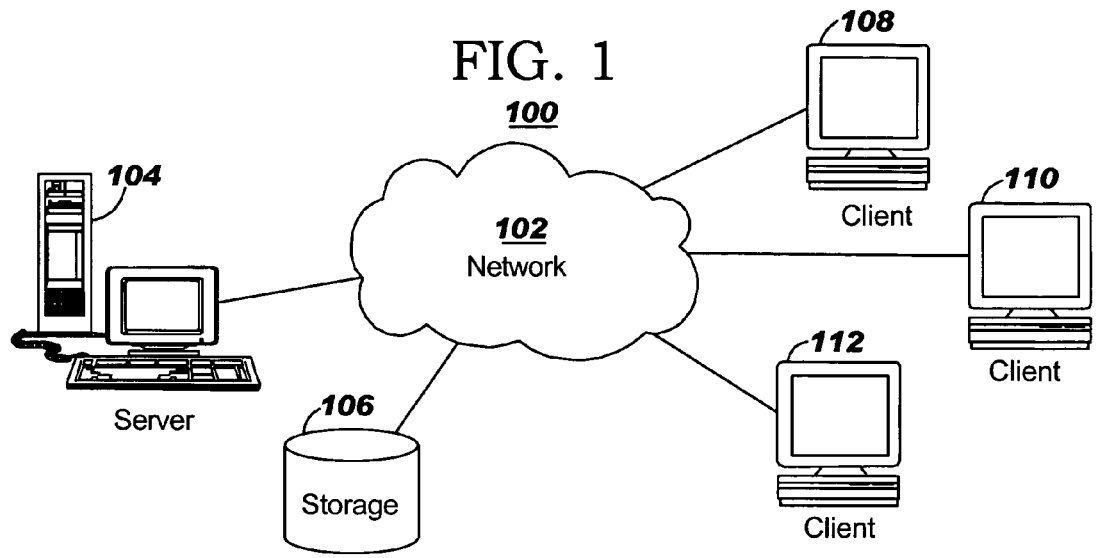
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
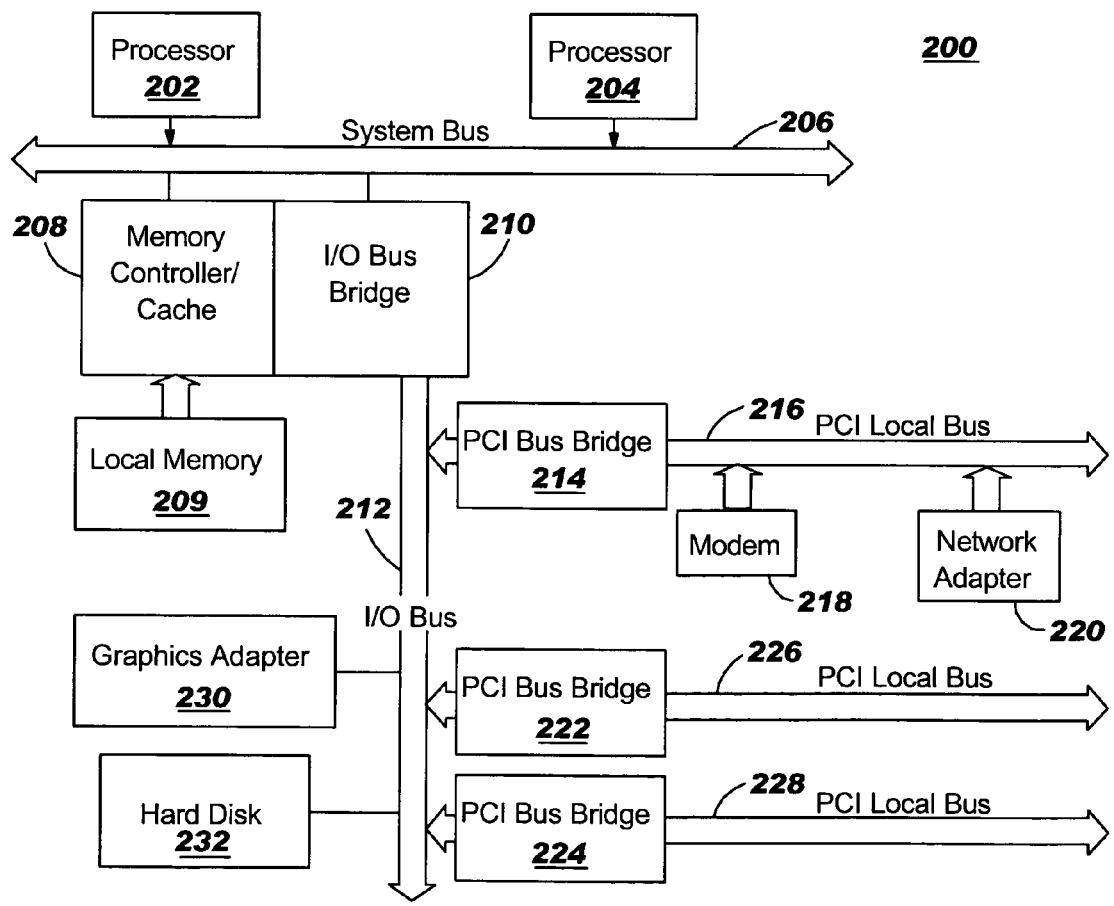
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
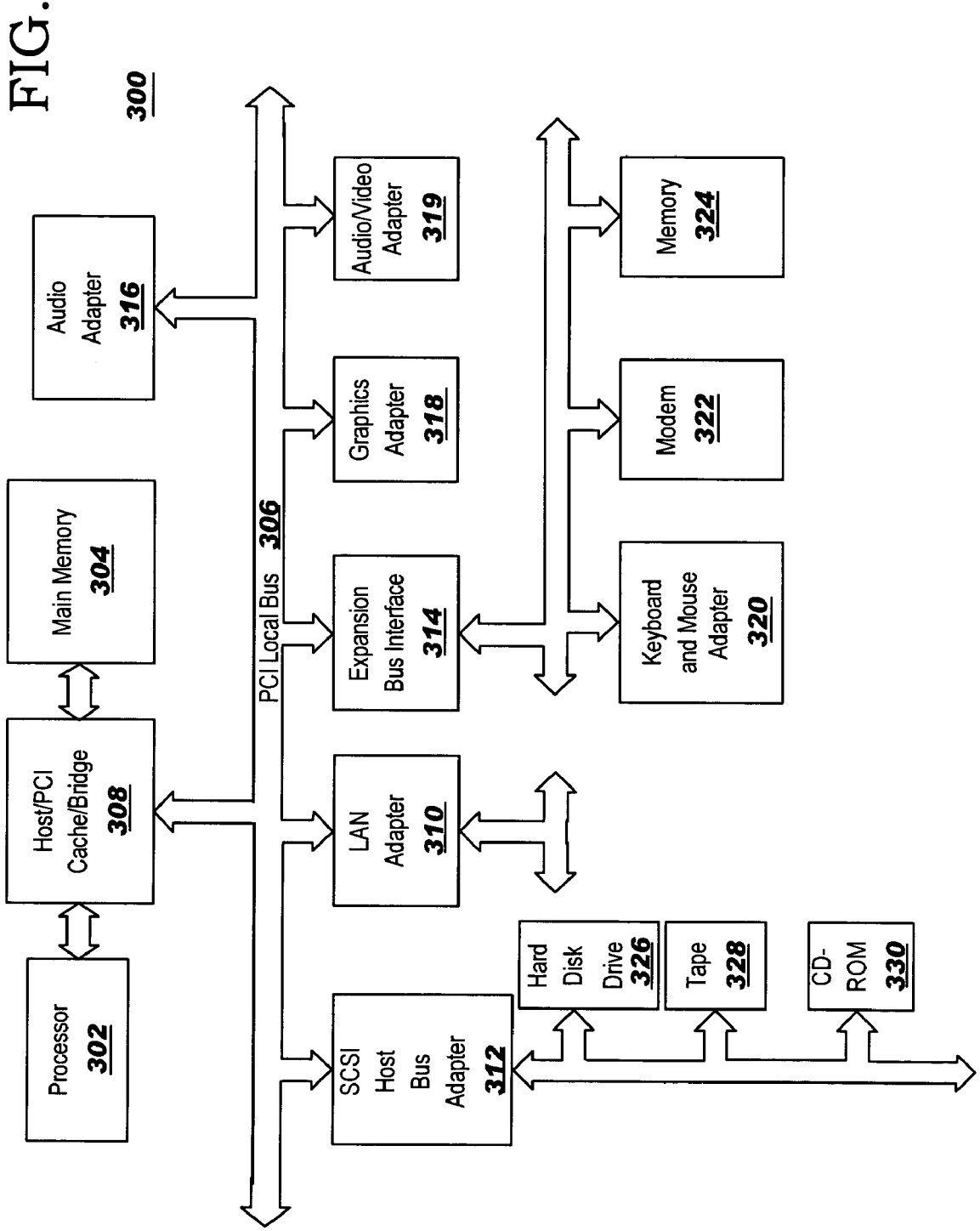
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java™ may run in conjunction with the operating system and provide calls to the operating system from Java™ programs or applications executing on data processing system 300. 'Java' is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus and computer instructions for generating a service pattern for an enterprise JavaBeans™ model using service data objects (SDOs) for data transfer. The present invention extends the current session bean façade pattern to provide ability for defining one or more SDOs for a container-managed persistent (CMP) entity bean and generating a session façade bean that includes methods for operating on a data graph.

Under the SDO specification, a client may retrieve a data graph from a data source, modifies the data objects in the data graph and applies the changes of the data graph to the data source. A data mediator service may be used to interact with the data source for producing data graphs representing the data and applying changes of the data graph to the data source. The present invention takes advantages of the data object, data graph, and data mediator service aspects of the SDO specification to provide a way for the client to apply changes of entity beans and its related entity beans to the data source, without the need to directly modify the entity beans themselves.

In a preferred embodiment, a client of the service pattern may define the session façade bean definitions, SDO definitions, and query definitions for SDOs. These definitions may be instrumented using annotations. Alternatively, these definitions may be instrumented using a meta-data descriptor resource. For example, in accordance with the enterprise JavaBeans specification available from Sun Microsystems, Inc, an enterprise JavaBean (EJB) JAR file contains a meta-data deployment descriptor file named 'ejb-jar.xml.' A user of the present invention may create an XML file named 'sdo-façade.xml' in the same directory as the 'ejb-jar.xml' file, such that information of the names and shapes of the SDOs, as well as queries and the session façade beans may be defined. In the context of the present invention, data objects, value objects and SDOs may be used interchangeably.

Session bean façade definitions specify SDOs and queries written in terms of the SDOs that contribute to the generation of the session bean façade. Each SDO and/or query added to the session bean façade will cause the generation of a root SDO which contains references to the top level SDOs. Each root SDO is managed by a data graph. In one embodiment, SDOs and queries in a session bean façade may be contributed from multiple entity bean classes to the same façade by using a 'match' attribute. As described in related patent application entitled "Method and Apparatus for Annotation-Based Behavior Extensions," which is incorporated by reference above, one or more secondary contributors may contribute behaviors to a primary contributor by matching a 'match' attribute of the secondary contributor against a 'name' attribute of the primary contributor.

Within the session bean façade definitions, a client may specify SDOs which include references to other SDOs. For each SDO that contributes to the session bean façade, a root SDO is generated and a set of methods are generated to operate on the root SDO, for example, create, read, update, and delete methods. In addition, advanced methods, such as the 'applychanges' method, may be generated to apply changes to the root SDO using a mediator.

On the other hand, SDO definitions for a CMP entity bean may be defined by annotating the CMP entity bean class. The annotations specify persistent attribute and relationship fields that are used to generate SDOs. Query definitions may also be defined using annotations in the CMP entity bean class to specify an entity query in terms of defined SDOs. The details of defining query definitions are described in related patent application entitled "Mechanism for Defining Queries in Terms of Data Objects" incorporated by reference above.

Once a client creates session façade bean definitions, SDO definitions, and query definitions for SDOs, the client may build the project, which processes defined annotations in the source files and generates classes for the session bean façade, root SDOs, and referenced SDOs.

As described in related patent application entitled "Method and Apparatus for Incrementally Processing Program Annotations," which is incorporated by reference above, annotations in a program source file may be processed incrementally to detect added, removed, or changed annotations in source files. A tag handler registered for a given namespace is used to create or update doclet objects in the doclet model. If the doclet model is changed, an annotation model transformer and a model content handler are used to transform changes in the doclet model to the semantic model. Thus, using this mechanism, changes to the session bean façade, root SDOs, and referenced SDOs may be incorporated in the generated classes and updated to the semantic model at development time, by modifying and saving the annotations in the entity beans.

In addition, query data object classes may be generated from the query definitions. As described in related patent application entitled "Mechanism for Defining Queries in Terms of Data Objects" which is incorporated by reference above, queries to a data source may be defined in terms of data objects. When the query is processed, the shape of the data objects is extracted and the query is transformed into a transformed query that can be processed by the mediator at runtime. The transformed query will include the CMP and CMR (Relationship) fields from the source CMP entity bean that compose the shape of the SDOs.

When a client wants to add an SDO at runtime, a client may instantiate an instance of the root SDO using a generated client factory. The client factory then associates the instance to a data graph and begins logging changes. The client may then create an instance of the SDO using the root SDO which will also add the SDO instance to the root SDO. The client may then set values on the SDO instance.

For example, a client may instantiate an EmployeeRoot data object using a generated SdoClientFactory, which also associates the root Employee object to a data graph and starts logging changes. The client then creates an Employee object instance using a method on the EmployeeRoot object, which also adds the Employee object instance to the EmployeeRoot object. Then, the client may set values on the Employee object instance.

Later, a client may obtain an instance of the session façade bean and invoke a method on the session façade bean to persist the new SDO instance to the data store. In turn, the session façade bean obtains an instance of the mediator from the mediator meta-data cache. In accordance with the SDO specification, which is incorporated by reference above, a mediator is a pluggable object that embodies mechanisms for retrieving data from a data source and composing an SDO data graph, as well as applying changes from the SDO data graph to the source. Thus, the mediator is a mechanism used to apply changes to SDOs within a data graph. For example, in WebSphere Application Server Version 6.0, a product available from International Business Machines Corporation, an EJB mediator is provided, which receives EJB QL query strings and an SDO meta model. From the query strings and SDO meta model, data for a given data graph may be retrieved and persisted to a data source.

Since each mediator is specific to a root SDO meta model type or shape of the SDOs, which corresponds to the EJB QL queries, the present invention embodies a mediator meta-data cache for instance creation of mediators that are to be used at run time. In other words, the mediator meta data cache holds an instance of mediator meta data for each root SDO meta model type, or meta-class.

Each Mediator meta data object holds the root SDO meta class, the EJB QL queries for the data to be retrieved, and mappings that describe the SDO meta classes for each entity bean represented by an SDO in the data graph. The SDO meta class is an object that describes the SDO itself. The SDO meta class contains meta information regarding the attributes and associations of the data object.

The session façade bean then applies changes to the SDO instance using the mediator, which persists the changes of the SDOs from the data graph to the data source.

When the client wants to retrieve an SDO, the client obtains an instance of the session bean façade and invokes a get method for the SDO on the session bean façade. The session bean façade then requests a mediator instance for the meta class of the root SDO corresponding to the request. After the mediator instance is obtained, the session bean façade requests a result data graph from the mediator. In turn, the mediator fetches data from the data source, constructs a data graph from the fetched data and returns the data graph to the session bean façade.

After the data graph is returned, the session bean façade retrieves the root SDO from the data graph and returns either an array of a particular SDO type within the data graph or the root SDO itself with all of the SDOs. Once an array or root SDO is returned, the client may display or operate on the SDOs. If the client wants to update the SDOs, the client may apply changes to the data graph using the session bean façade, which in turn uses the mediator to apply the changes.

In addition to retrieving all SDOs corresponding to an SDO definition for an Entity bean, the client may query the SDOs by certain criteria, for example, to find Employee SDOs by state and department. In this case, a query definition is used generate code on the session façade to retrieve the SDOs. At development time, a root SDO class will be generated to represent the query object. The query SDO will contain references to all the SDOs that are part of the query. At runtime, when applying changes, instead of retrieving the root SDO meta class for the SDO type, the session bean façade retrieves the SDO meta class for the query SDO from the data graph. Thus, at runtime, 'Root' SDOs and query SDOs are treated similarly as roots for applying changes.

By using SDOs for data transfer between the client and the session façade bean, the present invention improves bandwidth performance, since it is less expensive to serialize SDOs than the entity beans themselves, and since an entire graph of SDOs can be serialized in one remote method call, as opposed to multiple calls required by the prior art. In addition, no modification is required to the entity bean class and remote interface of the entity beans. Furthermore, the present invention leverages the power of service data objects to reflect relationships of the entity beans within each SDO to other SDOs. Thus, values of related SDOs are now synchronized. And by using SDOs, a course grained data transfer is provided in one call to the session façade, i.e., multiple related SDOs are returned in one data graph. Furthermore, by delegating the loading and retrieving of data in a data store to a mediator, instead of directly accessing the entity bean, lookup of the entity bean is no longer necessary as in previous implementations. In addition, the need for a client of a generated session bean façade or a generated session bean façade to locate or create entity instances is thus eliminated.

Turning now to FIG. 4A, a diagram illustrating a known implementation of the EmployeeData data access object is depicted. As depicted in FIG. 4A, EmployeeData object 400 is not related to any other data object. In addition, EmployeeData object 400 requires fields to capture the modified state of each persistent field, for example, isssnDirty field 402. In EmployeeData object 400 in FIG. 4B, initialize method 404 in FIG. 4B and copyTo method 406 in FIG. 4C are used to synchronize data to and from the EmployeeData object to another object that implements the EmployeeData.Store interface.

Turning now to FIG. 5, a diagram illustrating a known implementation of the Employee entity bean is depicted. As depicted in FIG. 5, in order to accommodate the EmployeeData object, Employee entity bean 500 is modified to implement the EmployeeData.Store interface.

In this example, three methods are added to Employee entity bean 500 for synchronizing with EmployeeData object 400 in FIGS. 4A and 4B. These methods include 'getEmployeeData' 502, 'setEmployeeData' 504, and 'syncEmployeeData' 506.

Turning now to FIG. 6, a diagram illustrating a known implementation of an updateEmployee method in a session bean façade is depicted. As depicted in FIG. 6, Employee façade bean 600 includes 'updateEmployee' method 602. 'UpdateEmployee method' 602 performs a lookup of the Employee local home by using a 'getEmployeeHome' method 604. An EJB local reference must be added to the session façade bean 600 in the 'ejb-jar.xml' deployment descriptor.

Once the EmployeeLocalHome is found, the correct Employee local EJB instance is located based on the primary key value found in the EmployeeData object. An example primary key may be a 'ssn'. Once the Employee local EJB instance is located, 'syncEmployeeData' method 606 is called to copy data from the EmployeeData object to the Employee local EJB instance, which then causes the data to be persisted to the data store. Thus, the session façade bean directly interacts with the entity bean from within.

Figure 7:
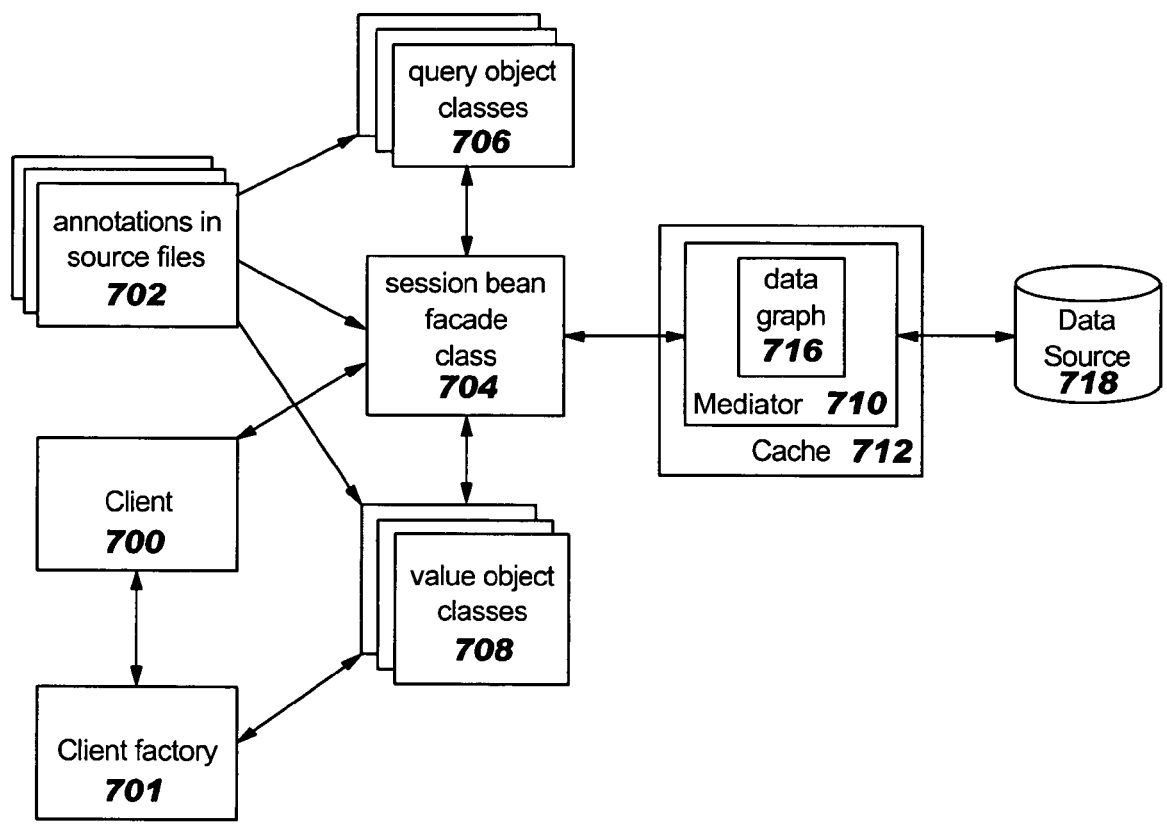
FIG. 7 is a diagram illustrating interactions between components for generating a service data object service pattern for an EJB model in accordance with a preferred embodiment of the present invention.

Turning now to FIG. 7, a diagram illustrating interactions between components for generating a service data object service pattern for an EJB model is depicted in accordance with a preferred embodiment of the present invention. As shown in FIG. 7, in this example implementation, client 700 may define a session façade bean, SDOs, and query for the SDOs using annotations defined in a number of annotations in source files 702. Alternatively, client 700 may define a session façade bean, SDOs, and queries for the SDOs using a deployment descriptor. When the client builds a project that includes source files 702, session façade bean class 704, query object classes 706, SDO classes 708, and client factory 701 are generated from the annotations. Query object classes 706 and a subset of SDO classes 708 are root SDOs.

When client 700 later wants to create new SDOs, client 700 may invoke a create method on client factory 701 to create instances of root SDOs, and in turn use the SDO classes 708 to create instances of referenced SDOs and add the SDO instances to the root class. The SDO instances are then returned to client 700 to set the initial values. Once the instance values are set, client 700 invokes a method on session bean façade class 704 to pass the SDO contained within a data graph 716 to be persisted via a Mediator 710.

Session bean façade class 704 requests mediator 710 from mediator meta data cache 712 based on the SDO to be persisted and invokes a 'applychanges' method on mediator 710. 'ApplyChanges' method causes mediator 710 to persist changes from data graph 716 to data store 718. Data graph 716 is a tree representation of the SDO and its relationship with other SDOs. Data graph 716 contains necessary data, used by mediator 710, to persist the SDO in data source 718. In addition, data graph 716 includes a changeSummary object that tracks all changes made to the SDOs in the data graph.

Mediator 710 uses the changeSummary object to determine what is changed in data graph 716 in order to persist changes to data source 718.

When client 700 wants to send a query to retrieve a SDO, for example, getEmployeeByStateDept, client 700 invokes a query method on session bean façade class 704 and passes in parameters for values of the 'where' clause. In turn, mediator 710 executes the query and populates data graph 716 using return data from data store 718 and passes the retrieved query root SDO instance back to client 700 using data graph 716. However, if the results of the executed query are empty, mediator 710 returns a 'null' back to client 700.

Figure 8A:
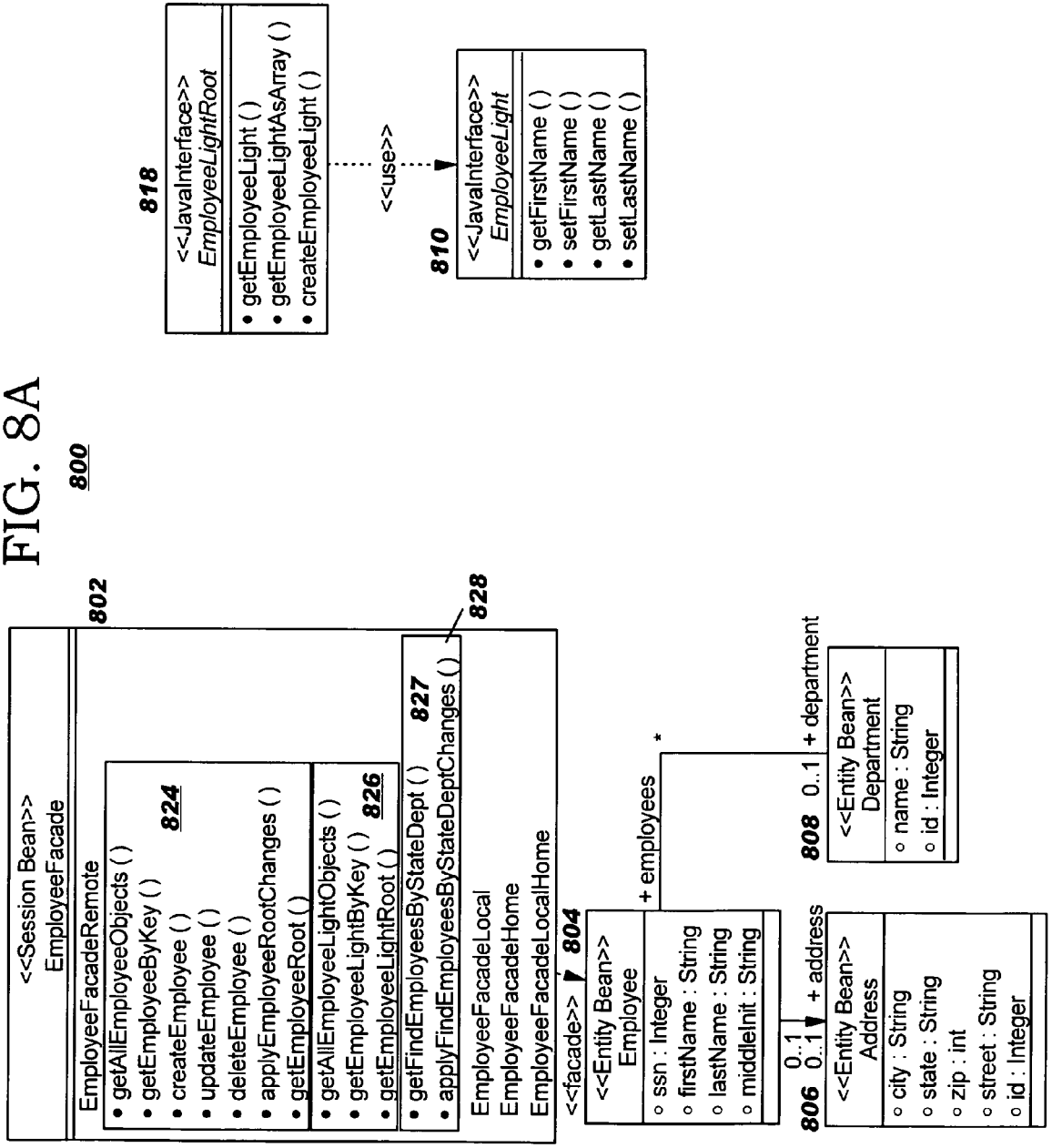
FIG. 8A is a diagram illustrating an exemplary service pattern for an EJB model in accordance with a preferred embodiment of the present invention.

Turning now to FIG. 8A, a diagram illustrating an exemplary service pattern for an EJB model is depicted in accordance with a preferred embodiment of the present invention. As depicted in FIG. 8A, service pattern 800 includes a generated session façade, named 'EmployeeFacade' 802, and a number of defined entity beans, including 'Employee' entity bean 804, 'Address' entity bean 806, and 'Department' entity bean 808. Entity beans 804, 806, and 808 are defined using the J2EE Enterprise JavaBeans™ specification available from Sun Microsystems, Inc.

Figure 8B:
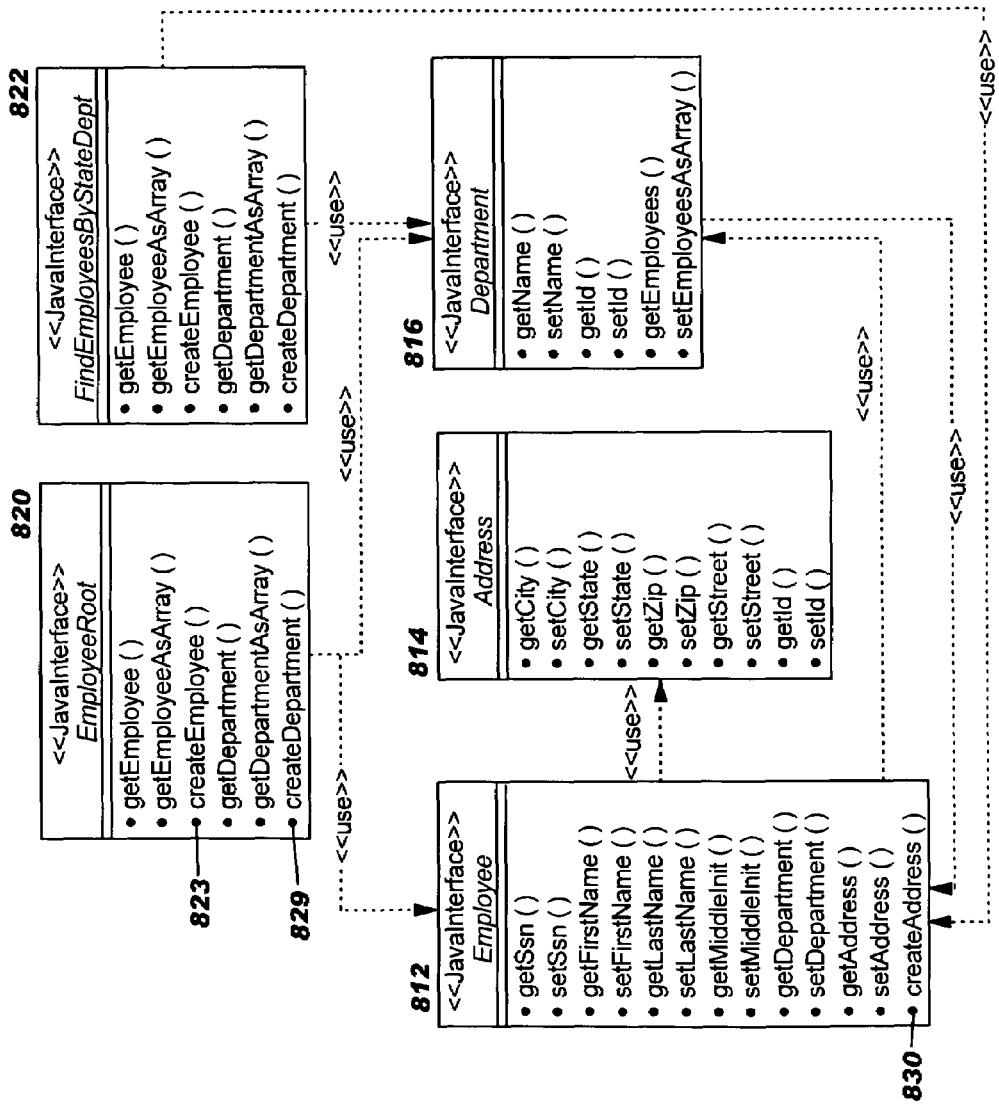
FIG. 8B is a diagram illustrating an exemplary service pattern for an EJB model in continuation of FIG. 8A in accordance with a preferred embodiment of the present invention.

Service pattern 800 also includes generated SDOs, including 'EmployeeLight' 810 in FIG. 8A, 'Employee' 812, 'Address' 814, and 'Department' 816 in FIG. 8B. In a preferred embodiment, these SDOs are defined using annotations in the entity beans. In addition, root service data object classes, such as 'EmployeeLightRoot' 818 in FIG. 8A, 'EmployeeRoot' 820 in FIG. 8B, and query data object class, such as 'FindEmployeeByStateDept' 822 in FIG. 8B, are also added to service pattern 800. These root SDOs are generated because the 'EmployeeLight' 810 and 'Employee' 812 SDOs were added directly to the 'EmployeeFacade' 802 to be managed. The root SDOs provide a top level object to be used by the mediator for meta-model reflection in order to populate or persist changes from a data graph. The 'FindEmployeeByStateDept' 822 root SDO is generated because a query named 'FindEmployeeByStateDept' was added to 'EmployeeFacade' 802 to be managed. Root SDOs signify the results of a specific query shape which is described by the SDO and its relationships.

In a preferred embodiment, the above SDOs and session bean facade are generated using annotations defined in entity bean classes 804-808. Examples of how the above SDOs and session bean façade correlate to the annotations are described in further detail in FIGS. 9, 10, and 11.

Turning now to FIG. 9A, a diagram illustrating an exemplary implementation of an Employee entity bean class is depicted in accordance with a preferred embodiment of the present invention. As shown in FIG. 9A, in this example implementation, Employee bean class 900 defines Employee entity bean 804 in FIG. 8A. Employee bean class 900 includes a number of annotations, including EmployeeFaçade annotation 902, Employee SDO annotation 904, and EmployeeLight SDO annotation 906.

EmployeeFaçade annotation 902 defines behavior for EmployeeFaçade 802 in FIG. 8A. Employee SDO annotation 904 contributes to the generation of Employee 812 in FIG. 8B and EmployeeLight SDO annotation 906 contributes to the generation of EmployeeLight 810 in FIG. 8A.

EmployeeFaçade annotation 902 includes an attribute of 'value-objects.' The 'value-objects' attribute identifies a number of SDOs that are to be managed by the façade. In the example in FIGS. 8A and 8B, 'Employee' 812 and 'EmployeeLight' 810 are managed by 'EmployeeFaçade' 802. 'EmployeeRoot' 820 and 'EmployeeLightRoot' 818 are generated to represent the query shape of the Employee 812 and EmployeeLight 810 query shapes. These roots contain the results, SDOs, and related SDOs when the query is executed. As one of ordinary skill in the art would appreciate, using annotations to define multiple attributes in an entity bean using 'value-objects' tags is similar to using other prior art mechanisms, such as 'ejb.value-object' tag in the XDoclet specification, a specification available from the XDoclet team of the open source SourceForge project.

Within 'Employee' SDO annotation 904 and 'EmployeeLight' SDO annotation 906, there are 'read-only' attributes 905 and 907, which identify whether only read methods should be created in 'EmployeeFagade' 902 for the 'Employee' and 'EmployeeLight' SDOs. By default, when a SDO is managed by a façade, a set of methods, such as create, read, update, and delete are generated. These methods are generated to manage instances of the SDO. However, if the 'read-only' attribute is set to true, like 'read-only' attribute 907 in 'EmployeeLight' SDO annotation 906 in this case, only read methods are generated in the façade. Thus, the client may only retrieve 'EmployeeLight' SDO instances from the 'EmployeeFacade' 902.

For example, in FIG. 8B, when Employee 812 is added as an SDO in EmployeeFaçade 802 in FIG. 8A, methods 824 are also added in EmployeeFaçade 802 to get, create, update, and delete Employee 812. This means that Employee 812 may be modified by the client. On the other hand, when EmployeeLight 810 is added as an SDO in EmployeeFaçade 802, only read methods 826 are added in EmployeeFaçade 802 to get the EmployeeLight 810 from EmployeeLightRoot 818. Thus, no modification is allowed for EmployeeLight 810.

Also shown in FIG. 9A, Employee bean class 900 includes query annotation 908, which defines a query to be included in EmployeeFaçade 902, as indicated by the 'queries' attribute 909. This query defines query strings that are defined in terms of the SDOs already defined in Employee bean class 900. In this example, query annotation 908 defines a query named 'FindEmployeesByStateDept' 910. 'FindEmployeesByStateDept' 910 defines 'Employee' 812 in FIG. 8B as the root and that 'Employee' 812 is related to Department 816 and Address 814 in FIG. 8B. Also in this example, the definition of 'FindEmployeeByStateDept' in 'queries' attribute 909 contributes to the generation of FindEmployeeByStateDept 822 and methods 'getFindEmployeesByStateDept' 827 and 'applyFindEmployeesByStateDeptChanges 828 in FIG. 8B.

In addition to session façade annotation 902, and SDO annotations 904, 906, and 908, Employee bean class 900 defines a number of accessor method annotations, 912 in FIGS. 9A and 914-922 in FIG. 9B. Accessor method annotations 912-922 indicate that a number of attributes from Employee entity bean 804 should be added to 'Employee' 812 in FIG. 8B or 'EmployeeLight' 810 in FIG. 8A, as indicated by the 'match' attribute. These attributes include 'ssn,' 'firstName,' 'lastName,' 'middleInit,' 'department,' and 'address.'

In addition to the 'match' attribute, CMR accessor method annotation 920 in FIG. 9B includes a 'target-value-object' attribute 923 and a 'contained' attribute 924. 'Target-value-object' 923 attribute indicates that a relationship exists between the current SDO and another SDO. 'Contained' attribute 924 helps defining this relationship by indicating whether the matching SDO manages the containment of the target SDO.

In this example, 'contained' attribute 924 is set to false. Thus, in FIG. 8B, 'Employee' 812 does not manage the containment of 'Department' 816, as indicated by a Department 'target-value-object' attribute. In this case, createDepartment method 829 in FIG. 8B is generated in 'EmployeeRoot' 820, instead of 'Employee' 812, since the containment defaults to 'EmployeeRoot' 820 when 'Department' 816 is not contained by another SDO, such as 'Employee' 812.

On the other hand, CMR accessor method annotation 922 in FIG. 9B includes a 'target-value-object' attribute 925 of 'Address' and a 'contained' attribute 926 that is set to true, which means that Employee 812 manages the containment of Address 814. In this case, createAddress method 830 is generated in Employee 812, instead of EmployeeRoot 820.

Containment of Address 814 in Employee 812 also applies to a delete situation. If an instance of Employee 812 is deleted from the data graph, Address 814 is also deleted as a result of the containment relationship between Address 814 and Employee 812. This means that both Employee instance 812 and Address instance 814 contained within Employee instance 812 are removed from the data graph and the underlying data source.

Turning now to FIG. 10, a diagram illustrating an exemplary implementation of a Department entity bean class is depicted in accordance with a preferred embodiment of the present invention. As shown in FIG. 10, in this example implementation, Department bean class 1000 includes 'value-object' annotation 1002, which contributes to the generation of Department 816 SDO in FIG. 8. Since the 'read-only' attribute 1003 is set to false, a set of methods, including create, read, update, and delete (CRUD) methods, are generated in any defined session bean façade that manages this SDO.

Also shown in FIG. 10, Department bean class 1000 includes a number of accessor method annotations, accessor method annotations 1004-1008. Accessor method annotations 1004-1008 indicate that a number of attributes from Department entity bean 808 should be added to Department 816, as indicated by the 'match' attribute. These attributes include 'name,' 'employees,' and 'id.'

In addition to the 'match' attribute, CMR accessor method annotation 1008 includes a 'target-value-object' attribute 1010 of 'Employee' and a 'contained' attribute 1012 of 'false.' This means that Department 816 does not manage the containment of Employee 812. Thus, createEmployee method 823 is generated in EmployeeRoot 820, since the containment defaults to the root SDO if it is not contained by any other SDO. In addition, if Department 816 is deleted, employees referenced by Department 816 will not be deleted, since employees are contained by EmployeeRoot 820.

Turning now to FIG. 11, a diagram illustrating an exemplary implementation of an Address entity bean class is depicted in accordance with a preferred embodiment of the present invention. As shown in FIG. 11, in this example implementation, Address bean class 1100 only includes 'value-object' annotation 1102, which contributes to the generation of Address 814 in FIG. 8. As in other known implementations, by default, when the value-object definition occurs at the type declaration, and no accessor methods are annotated, an SDO with all CMP fields and no CMR fields will be generated. Thus, all CMP fields from the Address entity bean 806 are added by default to Address 814, including 'city,' 'state,' 'zip,' 'street,' and 'id.'

Since the 'read-only' attribute 1104 is set to false, a set of methods, including create, read, update, and delete (CRUD) methods, are generated in any defined session bean façade that manages this SDO.

Figure 12A:
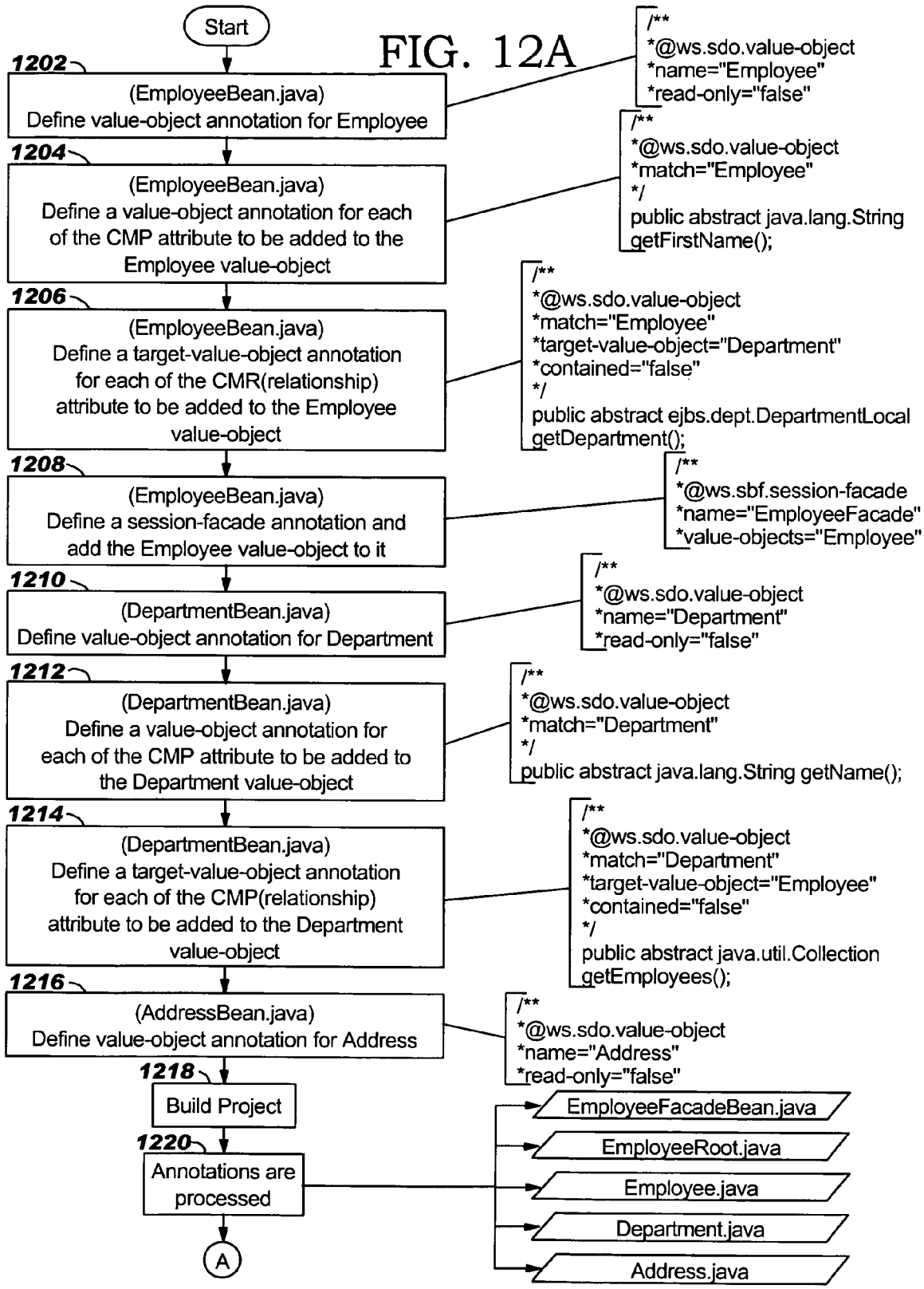
FIG. 12A is a flowchart of an exemplary process for defining session bean façade and SDO annotations in Employee, Department, and Address entity beans in accordance with a preferred embodiment of the present invention.

Turning now to FIG. 12A, a flowchart of an exemplary process for defining session bean façade and SDO annotations in Employee, Department, and Address entity beans is depicted in accordance with a preferred embodiment of the present invention. This process provides steps for defining annotations in Employee bean class 900 in FIG. 9, Department bean class 1000 in FIG. 10, and Address bean class 1100 in FIG. 11.

As shown in FIG. 12A, the process begins when a client defines a value-object annotation for the Employee SDO in the Employee entity bean class (step 1202). Next, the client defines a value-object annotation for each CMP attribute to be added to the Employee SDO (step 1204), for example, 'first name,' 'last name,' and 'middle initial. This is performed by adding an annotation to the get accessor method of the attribute which uses the 'match' tag's value to point to the value-object that the attribute should be contributed.

Then, the client defines a target-value-object annotation for each CMR (relationship) attribute to be added to the Employee SDO (step 1206), for example, 'department' and 'address.' Once the annotations for the CMP and CMR fields are defined, the client may define a session façade annotation and add the Employee SDO to the façade (step 1208).

Since the Employee SDO relates to a Department SDO, the client continues to define a value-object annotation for the Department SDO in the Department entity bean class (step 1210). Next, the client defines a value-object annotation for each CMP attribute to be added to the Department SDO (step 1212), for example, 'name' and 'id' by placing a 'match' annotation on the accessor method. Then, the client defines a target-value-object annotation for each CMR (relationship) attribute to be added to the Department SDO (step 1214), for example, 'Employee.'

In addition to Department, Employee SDO also relates to Address SDO. Thus, the client defines a value-object annotation for the Address SDO in the Address entity bean class (step 1216) by placing a 'match' annotation tag on the getAddress accessor method. Once the Employee, Department, and Address entity bean classes are defined, the client builds the project (step 1218) and annotations within these classes are processed (step 1220). As a result, a set of SDO classes is generated. The set of generated SDO classes includes EmployeeFaçade bean class, EmployeeRoot class, Employee class, Department class, and Address class.

After step 1220, the client continues to define a query in the Employee entity bean class. These steps are discussed in further detail in FIG. 12B. Thus, the mechanism of the present invention generates associations between SDOs in the service pattern that correspond to their respective entity beans. For example, the relationship between Employee SDO and Department SDO and the relationship between the Employee SDO and Address SDO.

Figure 12B:
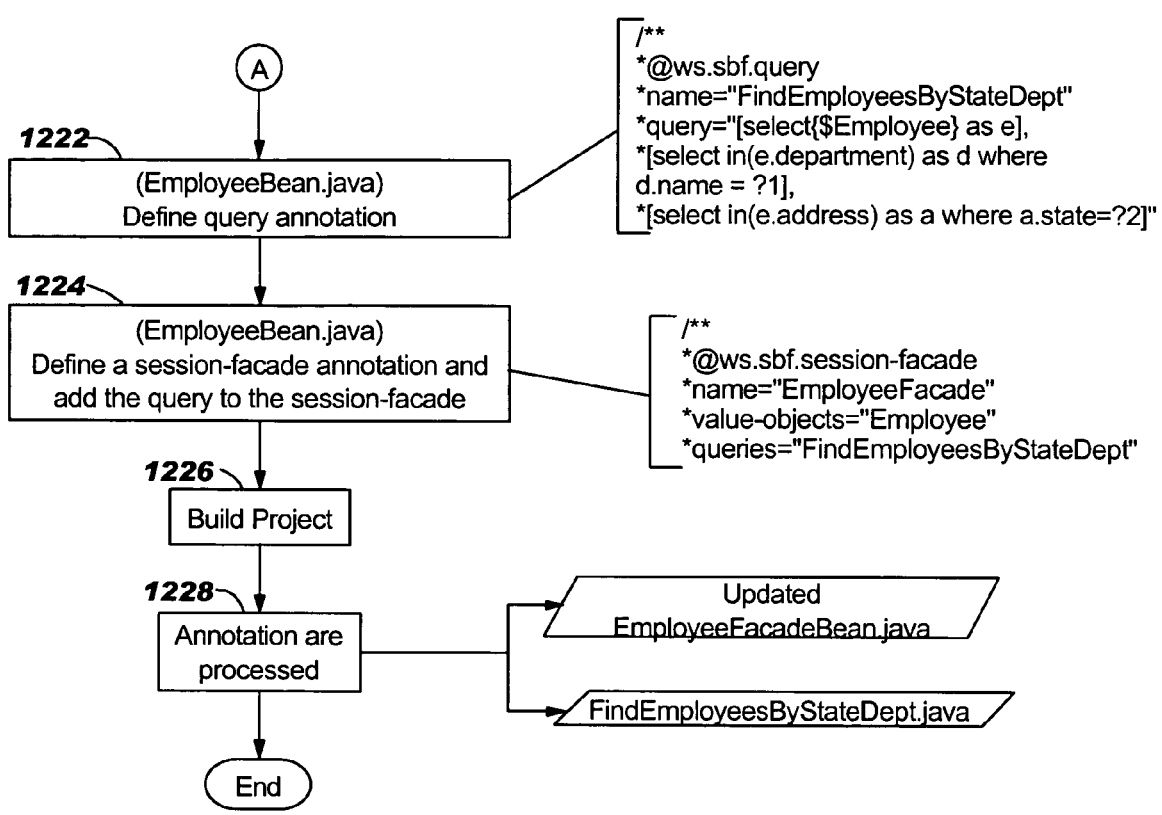
FIG. 12B is a flowchart of an exemplary process for defining query annotations in Employee entity bean in accordance with a preferred embodiment of the present invention.

Turning now to FIG. 12B, a flowchart of an exemplary process for defining query annotations in the Employee entity bean is depicted in accordance with a preferred embodiment of the present invention. This process provides the steps for defining the query annotation in the Employee bean class 900 in FIG. 9.

As shown in FIG. 12B, the process begins when a client defines a query annotation for a query SDO in Employee entity bean class (step 1222). The query includes query strings that are defined in terms of the SDOs already defined in Employee bean class 900 in FIG. 9. The name specified in the 'name' annotation attribute is used as the Java type name when generating the root SDO and methods in the façade for this query. In addition, more than one query annotation may be defined in the same entity bean.

Once the query is defined, the client may define a session façade annotation and add the query to the EmployeeFaçade (step 1224). The query is added using a 'queries' annotation attribute. If a client defines more than one query, a space delimiter may be used to delimit each query in the 'queries' attribute. In addition, a query from another entity bean resource may be added as a secondary contributor to the façade using a 'match' attribute.

After the query is added, the client then builds the project (step 1226) and annotations in the Employee entity bean class are processed (step 1228). As a result, a query SDO class, 'FindEmployeesByStateDept' class, and an updated EmployeeFaçade bean class are generated. The updated EmployeeFaçade bean class includes updated query methods for the query SDO class, FindEmployeesByStateDept class. Thus, the process terminates thereafter. Therefore, the mechanism of the present invention allows user to associate query definitions with a session bean façade based on the query annotation defined in the entity bean. As a result, query methods for the query SDO are generated on the session bean façade.

Figure 13:
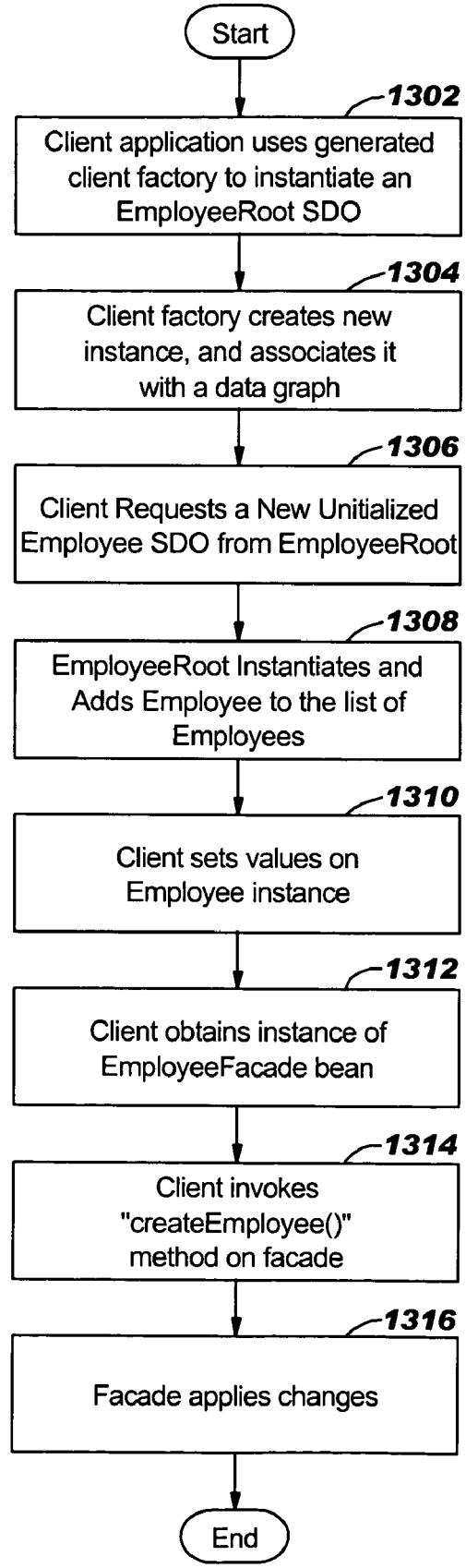
FIG. 13 is a flowchart of an exemplary process for run time creation and persistence of a new Employee SDO in accordance with a preferred embodiment of the present invention.

Turning now to FIG. 13, a flowchart of an exemplary process for run time creation and persistence of a new Employee SDO is depicted in accordance with a preferred embodiment of the present invention. As shown in FIG. 13, the process begins when the client application uses a generated client factory class to obtain a new EmployeeRoot SDO (step 1302). The client application may be any component that uses the session bean façade for data access, transfer, or update. These components include other enterprise JavaBeans™, Web applications as defined by a Java™ Servlet specification, and application clients as defined by the J2EE specification. Both Java™ Servlet specification and J2EE specification are specifications available from Sun Microsystems, Inc.

Next, the client factory instantiates a new EmployeeRoot SDO and associates it with a data graph (step 1304). The client factory creates a new data graph and adds the new EmployeeRoot SDO to the data graph. The data graph is used for data transfer or serialization, as well as later mediator meta-data look up for persistence. The client factory then also ensures that change recording is switched on for the new data graph. The client then uses the createEmployee method on the EmployeeRoot SDO to instantiate an un-initialized Employee SDO (step 1306) In turn, EmployeeRoot SDO instantiates the Employee SDO and automatically adds to the list of employees held by the EmployeeRoot (step 1308). At this time, the data graph tracks the addition of the Employee SDO as a new object.

The client then works with the new Employee SDO by setting its values (step 1310). When setting the values of the Employee SDO, other related SDOs, such as the Address SDO, may be created and set on the Employee SDO. The Address SDO is created by calling the createAddress method on Employee SDO. This method exists on Employee since containment is set to 'true' for the Address. After the values are set, the client may use well-known lookup methods to obtain an instance of the EmployeeFaçade (step 1312). In a preferred embodiment, the client caches the EmployeeFaçade for later use.

Once the EmployeeFaçade is obtained, the client invokes a generated 'createEmployee' method on the façade, with the newly created Employee SDO as an input parameter, to persist the data for the new Employee and its related SDOs (step 1314). The façade then applies the changes (step 1316). This step is discussed in further detail in FIG. 14. Thus, the process terminates thereafter.

Figure 14:
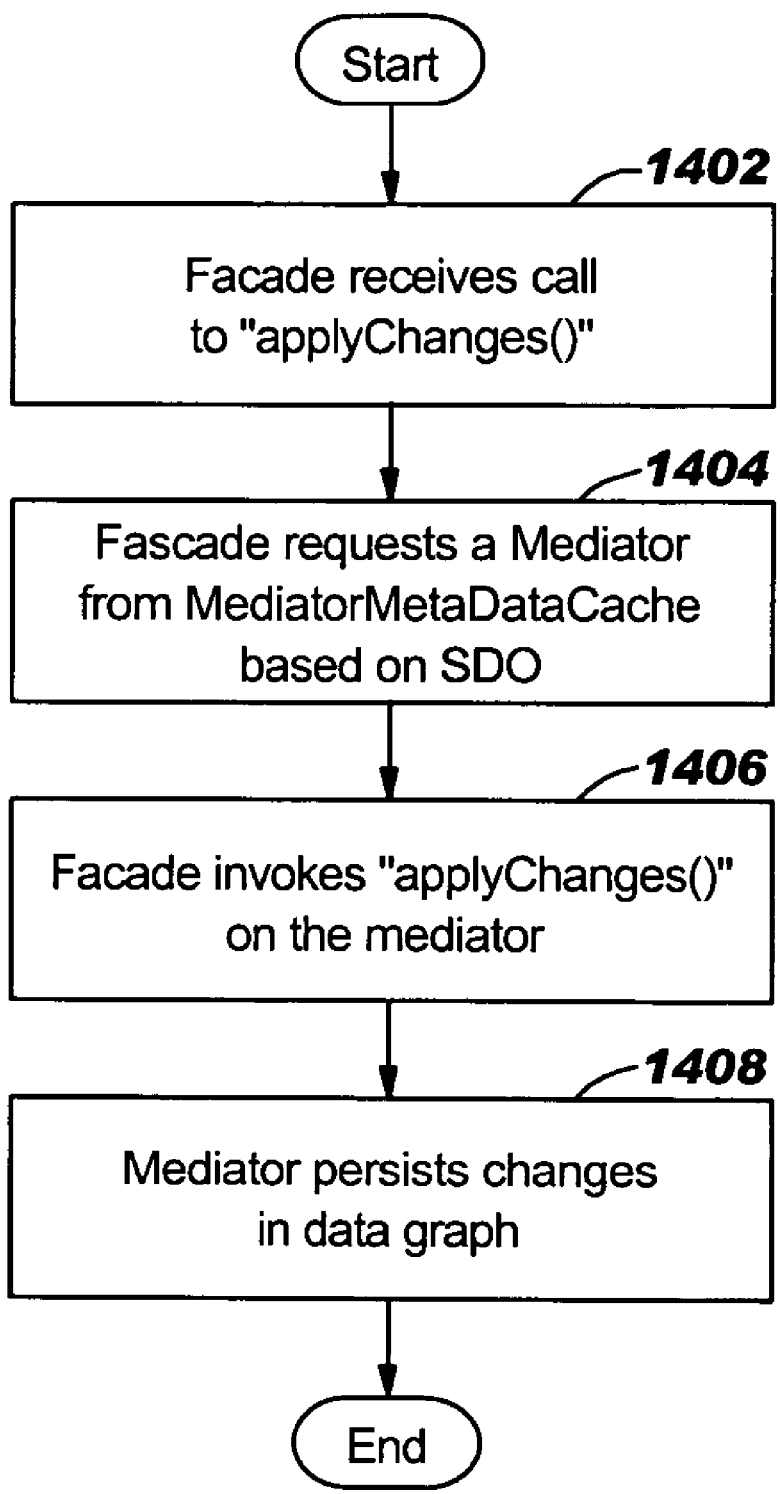
FIG. 14 is a flowchart of an exemplary process for applying changes to a SDO or a data graph of the SDO to a data store at run time in accordance with a preferred embodiment of the present invention.

Turning now to FIG. 14, a flowchart of an exemplary process for applying changes to a SDO or a data graph of the SDO to a data store at run time is depicted in accordance with a preferred embodiment of the present invention. This process describes step 1316 in FIG. 13 in further detail. As shown in FIG. 14, the process begins when the façade receives a call to apply changes (step 1402). The call is initiated when the client invokes a method, such as create, update, and delete, which requires data changes to be saved to the data source, on the façade to persist SDO data.

After the façade receives the call, the façade requests a mediator instance from a mediator meta-data cache based on a current SDO (step 1404). This step is discussed in further details in FIG. 15. The current SDO is an SDO passed to the applyChanges method. The current SDO is contained by the data graph having the changes to be applied. After a mediator is received, the façade invokes an 'applyChanges' method on the mediator with the current SDO as an input parameter (step 1406). The mediator then uses well-known methods in the SDO and data graph framework to determine if changes are present in the data graph. If changes are present, the mediator persists the changes of the data graph to the data store (step 1408). Thus, the process terminates thereafter.

Figure 15:
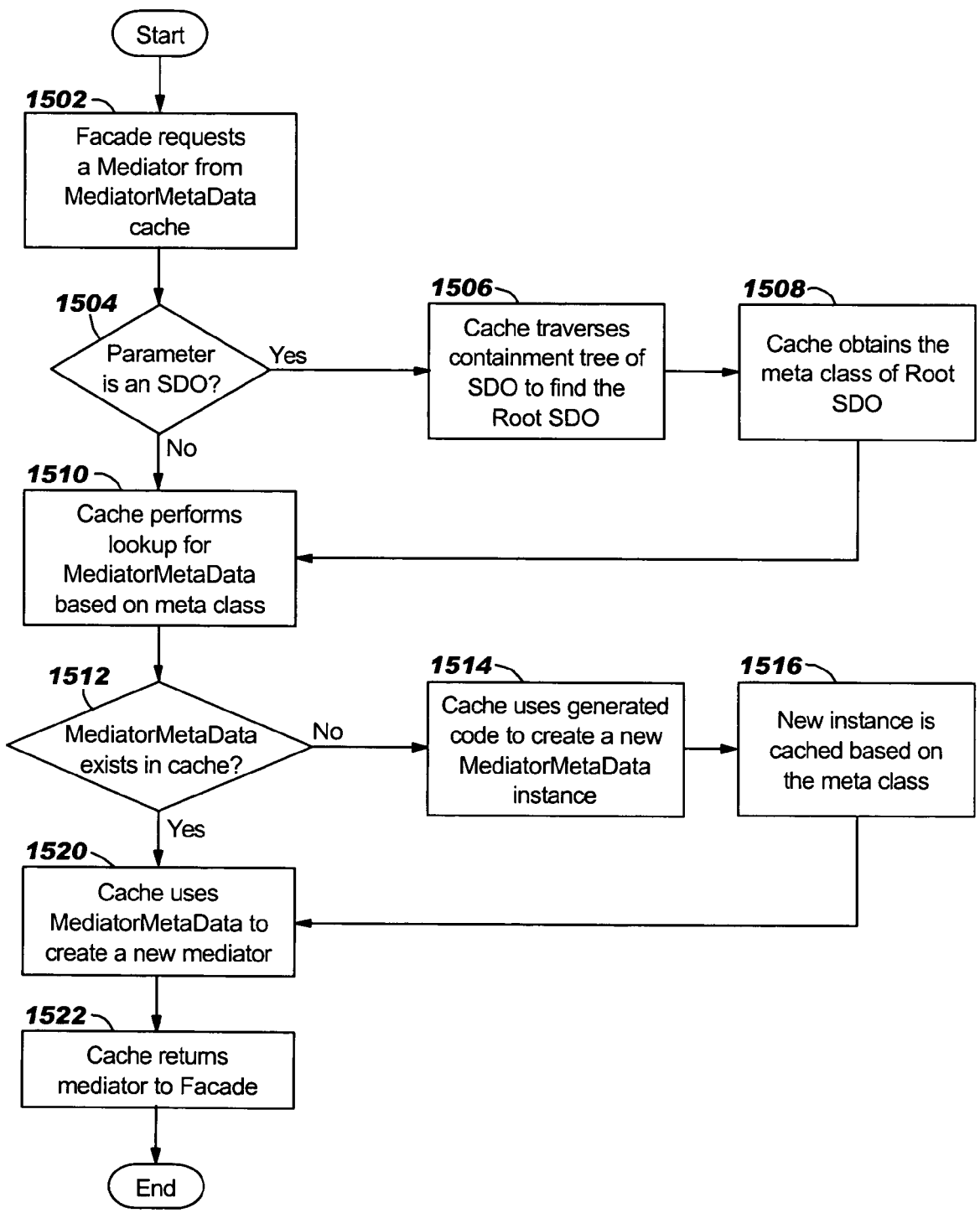
FIG. 15 is a flowchart of an exemplary process for obtaining a mediator for a given SDO or SDO meta class at run time in accordance with a preferred embodiment of the present invention.

Turning now to FIG. 15, a flowchart of an exemplary process for obtaining a mediator for a given SDO or SDO meta class at run time is depicted in accordance with a preferred embodiment of the present invention. This process describes step 1404 in FIG. 14 in further detail. As shown in FIG. 15, the process begins when a request is issued from the facade for a mediator (step 1502). The request includes a SDO or SDO meta class passed to the mediator meta data cache, query string overrides if exists, and an object array of 'where' clause values if exists.

The query string overrides allow developers to add user-defined methods to a generated façade with their own query strings. The methods obtain mediators defined for the same SDO shape, with additional information that does not affect the shape, but does affect the selection of the data, for example, 'where' clauses and 'order by' clauses. On the other hand, the 'where' clause values represent actual values to be substituted for named ordered parameters into the query strings when the data is retrieved.

When the request is received, a determination is made by the mediator meta-data cache as to whether the request is issued for a given SDO (step 1504). A mediator is specific to a given query or SDO shape. The mediator, and thus the mediator meta-data, includes all query language statements necessary for retrieval of data for the SDO and populating the data graph. If the request is not issued for a given SDO, then the parameter is a meta-class, and the process continues to step 1510.

If the request is issued for a given SDO, the mediator meta-data cache traverses the containment tree of the SDO to find the root SDO (step 1506). The root SDO either directly or indirectly contains all SDOs in a data graph. Thus, using well known APIs to obtain a 'container' object for an SDO, it is possible to find the root object of the data graph. Once a root SDO is found, the mediator meta-data cache obtains the meta class of the root SDO (step 1508), and the process continues to step 1510.

At step 1510, the mediator meta-data cache performs a lookup of mediator meta data based on the meta class and determines if a mediator meta data exists in the cache (step 1512). The mediator meta-data cache includes a mapping of mediator meta data instances for each root SDO meta class. Each root SDO has at most one mediator meta data instance.

If mediator meta data exists for the meta class, the process continues to step 1520. However, if no mediator meta data exists for the meta class, the mediator meta-data cache uses generated methods to create a new mediator meta data instance for the given root SDO (step 1514). The mediator meta data includes all information necessary for the mediator to carry out data retrieval and storage functions, including query statements and meta-model mappings, etc. The new mediator meta data instance is then cached based on the meta class (step 1516), and the process continues to step 1520.

At step 1520, the mediator meta-data cache uses the existing or newly created mediator meta data instance to create a new mediator. The new mediator may also be cached for later use. The mediator meta-data cache then returns the new mediator to the façade for retrieval and storage of data (step 1522). Thus, the process terminates thereafter.

Figure 16:
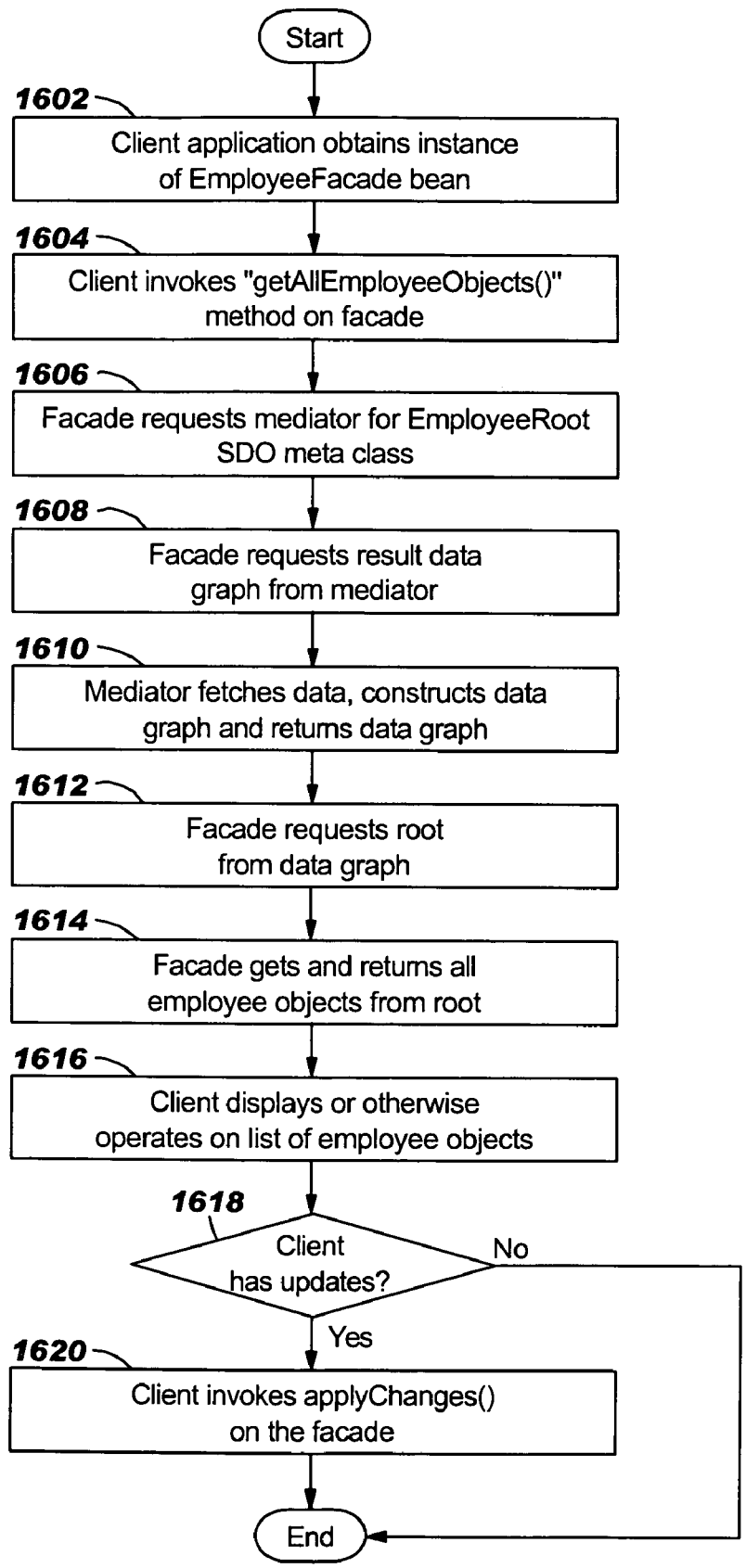
FIG. 16 is a flowchart of an exemplary process for retrieving a list of Employee SDOs at run time in accordance with a preferred embodiment of the present invention.

Turning now to FIG. 16, a flowchart of an exemplary process for retrieving a list of Employee SDOs at run time is depicted in accordance with a preferred embodiment of the present invention. As shown in FIG. 16, the process begins when the client application uses well-known lookup methods to obtain an instance of the EmployeeFaçade bean (step 1602). In a preferred embodiment, the EmployeeFaçade bean is cached for future use.

In this example, once the EmployeeFaçade bean is obtained, client invokes a 'getAllEmployeeObjects' method on the EmployeeFaçade to retrieve all Employee SDOs (step 1604). In turn, the EmployeeFaçade requests the mediator for the EmployeeRoot SDO meta class (step 1606). This step uses the process as described in FIG. 15.

Once the mediator is obtained, the façade requests the data graph from the mediator using methods specified by the mediator (step 1608). This step triggers execution of any query necessary for the mediator to obtain the results from the data store to populate a data graph. At this time, the mediator executes methods necessary to fetch data and returns the data graph after it is constructed (step 1610).

The façade then obtains the root of the data graph (step 1612). The root is an instance of the EmployeeRoot SDO. The façade retrieves all Employee SDOs from the root (step 1614) using generated methods of the root. After all Employee SDOs from the root are retrieved, the client may display or operate on the list of Employee SDOs (step 1616) as desired.

Later, a client may determine if updates to Employee SDOs are to be made (step 1618). Updates to Employee SDOs may include adding new Employee SDOs, removing existing Employee SDOs, and modifying values on existing SDOs. If no updates are to be made to the Employee SDOs, the process terminates thereafter. Otherwise, the client may invoke the 'applychanges' method on the EmployeeFaçade to apply changes of the Employee SDOs to the EmployeeRoot SDO (step 1620).

Since the same root contains all Employee SDOs, the EmployeeRoot SDO may be obtained from any of the Employee SDOs and passed to the 'applychanges' method. This 'applychanges' method transfers the data graph to the façade on the server. This data graph includes all the Employee SDOs returned at step 1614, except for SDOs that are deleted by the client. This data graph also includes SDOs that are added by the client. In turn, the façade applies the changes in the data graph using the process described in FIG. 14. Thus, the process terminates thereafter.

Figure 17:
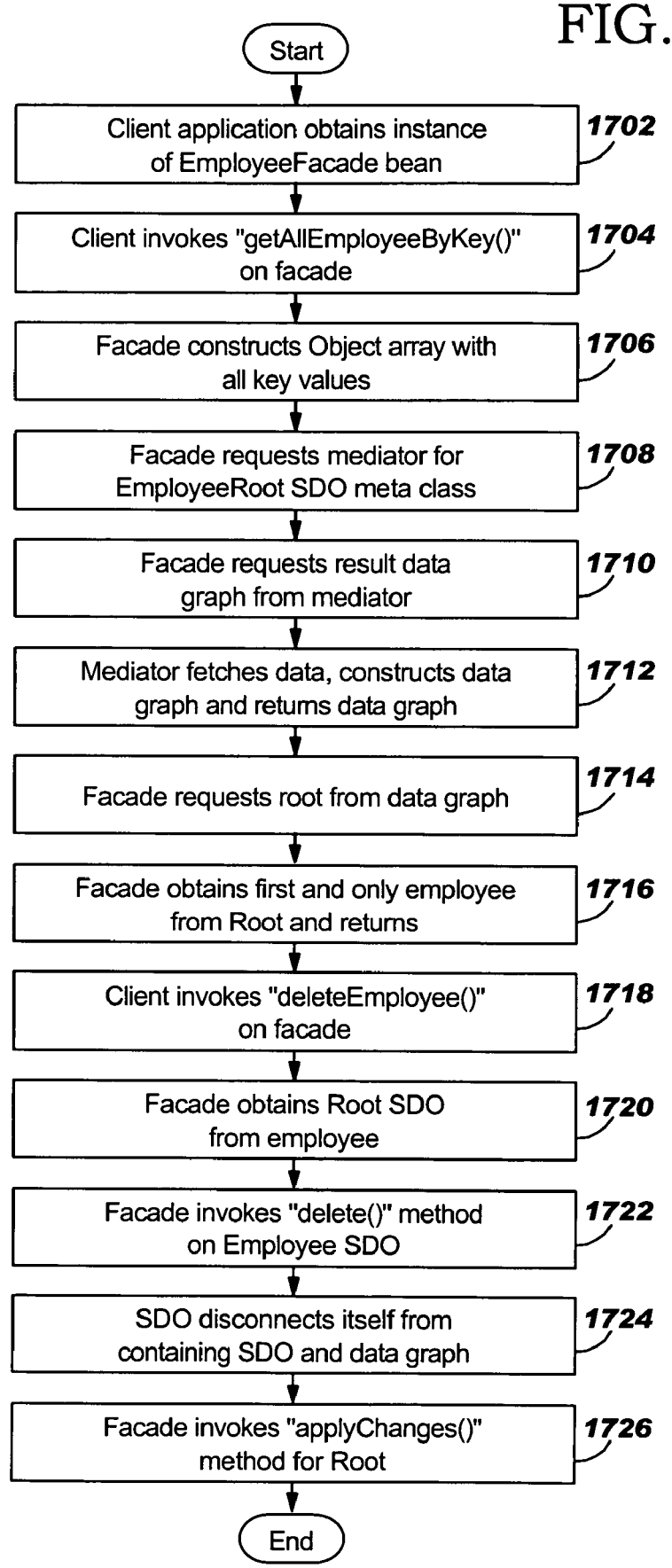
FIG. 17 is a flowchart of an exemplary process for locating and removing Employee SDO at run time in accordance with a preferred embodiment of the present invention.

Turning now to FIG. 17, a flowchart of an exemplary process for locating and removing an Employee SDO at run time is depicted in accordance with a preferred embodiment of the present invention. As shown in FIG. 17, the process begins when the client application obtains an instance of the EmployeeFaçade bean using well-known lookup methods (step 1702).

Next, the client invokes a 'getEmployeeByKey' method on the EmployeeFaçade to locate the Employee SDO (step 1704). The 'getEmployeeByKey' method is a generated public method that takes values for each of the key CMP fields defined for the Employee entity bean as input parameters. The façade in turn constructs an object array by adding the parameters values to the array (step 1706), such that the values may be used as the mediator 'where' clause values.

The façade then requests a mediator for the EmployeeRoot SDO meta class (step 1708). This step is performed using the process described in FIG. 12. The mediator is constructed using the where clause values to filter by key fields. A person of ordinary skill in the art will appreciate that the same root SDO and mediator meta data may be used to retrieve a list of Employee SDOs or a single Employee SDO, since the shape of the query or the SDO data graph is the same. The only difference is that the mediator uses 'where' clause values to filter the selection of the Employee objects.

Using methods specified by the mediator, the client requests the data graph from the mediator (step 1710). This step triggers execution of any query necessary for the mediator to obtain results and populate the data graph. The mediator obtains the data graph by executing methods necessary to fetch data. The mediator then constructs and returns the data graph (step 1712).

Using well known methods, the façade obtains the root of the data graph (step 1714) and then the first and only Employee SDO from the root (step 1716). Once the Employee SDO is obtained, the client may later invoke a 'deleteEmployee' method on the façade (step 1718) and pass in the Employee SDO as an input parameter.

The façade obtains the root SDO from Employee SDO (step 1720) and invokes a delete method on the Employee SDO (step 1722). The Employee SDO is then removed from its Employee root and disconnected from the data graph (step 1724). The data graph records this removal as a deletion. Finally, the façade invokes an 'applychanges' method, which obtains the mediator and applies the changes to commit the deletion of the Employee SDO in the data source (step 1726). Thus, the process terminates thereafter.

Figure 18:
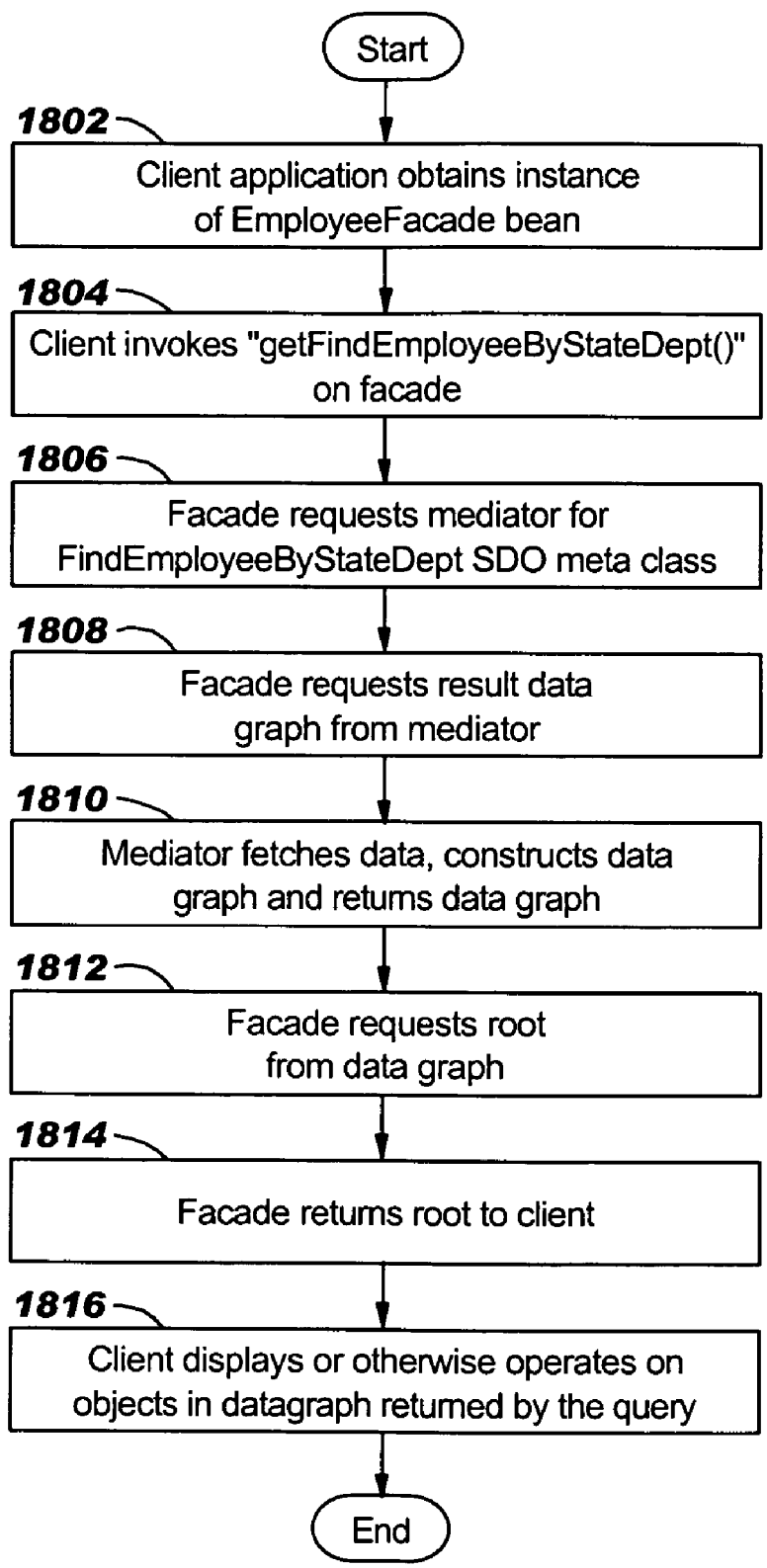
FIG. 18 is a flowchart of an exemplary process for retrieving an Employee SDO using a query at run time in accordance with a preferred embodiment of the present invention.

Turning now to FIG. 18, a flowchart of an exemplary process for retrieving an Employee SDO using a query at run time is depicted in accordance with a preferred embodiment of the present invention. As shown in FIG. 18, the process begins when the client obtains an instance of the EmployeeFaçade bean (step 1802) using well-known lookup methods. The façade bean is cached for later used.

Next, the client invokes a 'getFindEmployeeByStateDept' method on the façade (step 1804), which is a query generated as a result of query defined in the Employee entity bean. The where clause values of this query are used as input parameters to the method. Then, using the meta-class of the FindEmployeeByStateDept SDO, the façade requests a mediator (step 1806). This step is performed using the process described in FIG. 15. After a mediator is obtained, the façade requests the data graph from the mediator using methods specified by the mediator (step 1808). This step triggers execution of any query necessary for the mediator to obtain the result and populate the data graph.

The mediator then executes methods necessary to fetch data and constructs the data graph (step 1810). The mediator then returns the data graph, and the façade obtains the root of the data graph (step 1812). The root is a 'FindEmployeeByStateDept' SDO. Finally, the façade returns the root to the client (step 1814), and the client displays or operates on the objects in the data graph returned by the query (step 1816). Thus, the process terminates thereafter.

Turning now to FIG. 19, a diagram illustrating an exemplary implementation of Employee SDO and Department SDO is depicted in accordance with a preferred embodiment of the present invention. As shown in FIG. 19, the present invention uses SDOs, such as Employee SDO 1900, for data transfer of entity beans.

In this example implementation, in addition to a subset of available CMP attributes, Employee SDO 1900 allows relationship among SDOs to be modeled. For example, 'getDepartment' method 1902 and 'getAddress' method 1904 returns related Department and Address SDOs. In addition, Department SDO 1920 includes a 'getEmployees' method 1922 that returns a collection of related Employee SDOs.

Turning now to FIG. 20, a diagram illustrating an exemplary implementation of EmployeeFaçade bean is depicted in accordance with a preferred embodiment of the present invention. As shown in FIG. 20, instead of an update Employee method on an Entity interface, EmployeeFaçade 2000 updates an Employee SDO by using 'doApplyChanges' method 2002. doApplyChanges method 2002 creates a mediator for a given SDO.

EmployeeFaçade 2000 creates mediator meta-data cache instance 2004 (mediatorCache), which holds SDO meta model information and EJB queries for each SDO and query that are added to the façade. Mediator meta-data cache caches an instance of MediatorMetaData 2006 for each root SDO meta model type, for example, EmployeeRoot 2008. Thus, for each root SDO type, there is only one mediator created for that type. This ensures that when apply changes is performed, the correct mediator is returned for the SDO based on the meta model type.

Figure 21:
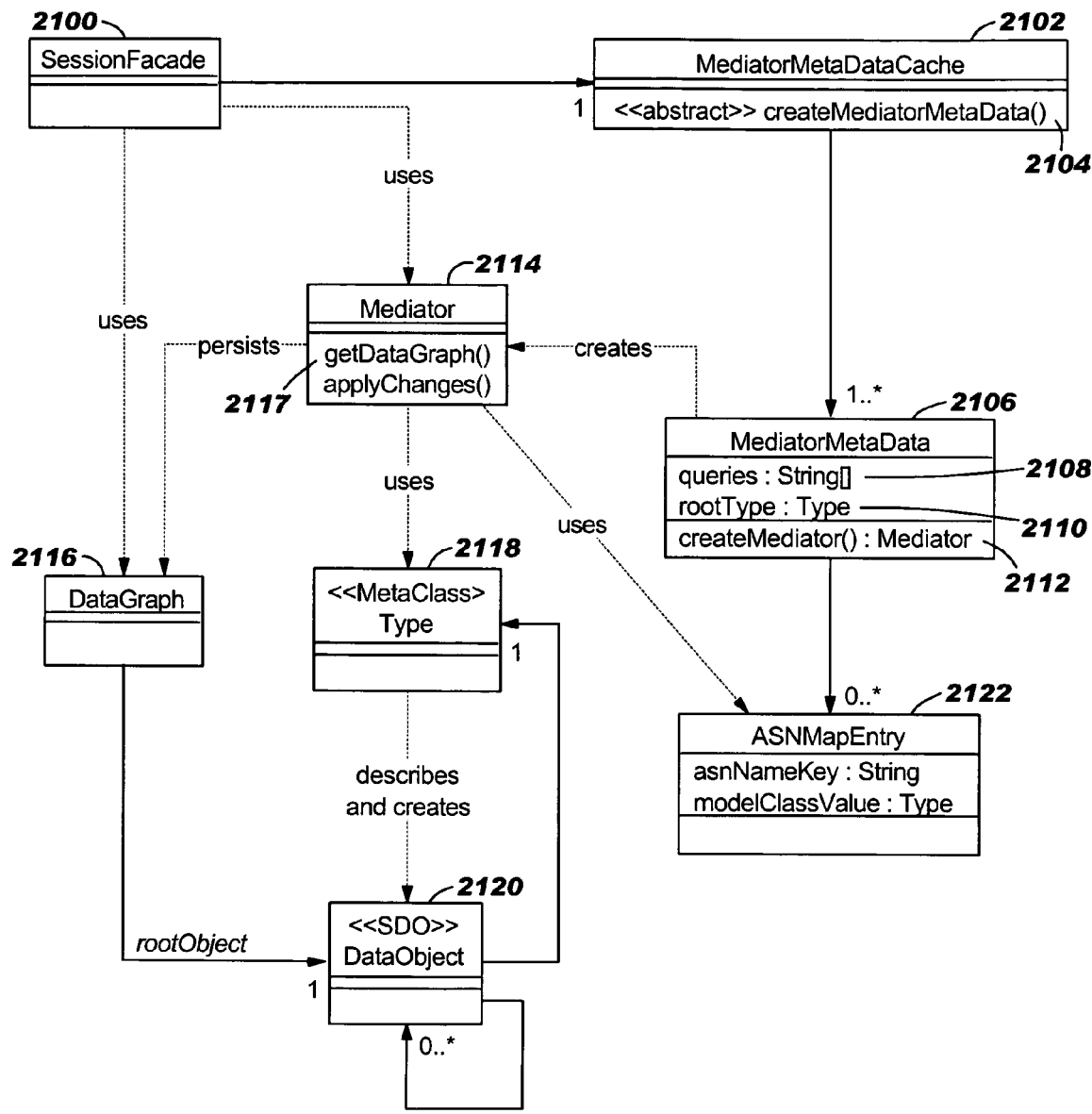
FIG. 21 is a diagram illustrating relationships between SessionFaçade, Mediator, MediatorMetaDataCache, SDO meta classes, and MediatorMetaData in accordance with a preferred embodiment of the present invention.

FIG. 21 describes relationships between SessionFaçade, Mediator, MediatorMetaDataCache, SDO meta classes, and MediatorMetaData in a greater detail.

Turning now to FIG. 21, a diagram illustrating relationships between SessionFaçade, Mediator, MediatorMetaDataCache, SDO meta classes, and MediatorMetaData is depicted in accordance with a preferred embodiment of the present invention. As depicted in FIG. 21, when a user invokes a method in SessionFaçade 2100 to commit changes to the SDOs, SessionFaçade 2100 attempts to locate a MediatorMetaData for the changed SDO in MediatorMetaDataCache 2102. If no MediatorMetaData is found, createMediatorMetaData method 2104 is invoked to create a new MediatorMetaData for the meta class of the root SDO. The createMediatorMetaData method 2104 is abstract, and thus concrete implementations are generated for a given defined façade. The generated method contains the meta model and query information necessary to construct the MediatorMetaData instance.

MediatorMetaDataCache 2102 is a container that holds one or more MediatorMetaData 2106. MediatorMetaData 2106 includes a set of query strings 2108 for the SDO and related SDOs, as well as root type 2110 that identifies the specific mediator for the SDO type, since only one instance of Mediator exists for each SDO type. Moreover, this root SDO type will be used by the Mediator at runtime for constructing a data graph based on query results. In addition, MediatorMetaData 2106 includes one or more ASNMapEntry 2122 that maps an abstract schema name of an entity bean to an SDO meta model type. ASNMapEntry 2122 is necessary for Mediator 2114 to determine the proper SDO type to create for each abstract schema name in the query. Each time a Mediator is required for a root SDO type, createMediator method 2112 is invoked to create a new Mediator 2114.

When Mediator 2114 is obtained, SessionFaçade 2100 uses Mediator 2114 to retrieve DataGraph 2116 for the SDO using getDataGraph method 2117. DataGraph 2116 is persisted in Mediator 2114 for each SDO and its related SDOs. Mediator 2114 uses meta class 'Type' 2118 as a meta model to create and describe each SDO or data object 2120 as well as each related data objects 2120.

Turning now to FIG. 22, a diagram illustrating an exemplary implementation of method for initializing the MediatorMetaData for the EmployeeRoot root SDO in the EmployeeFaçade bean is depicted in accordance with a preferred embodiment of the present invention. As shown in FIG. 22, the MediatorMetaDataCache holds EJB QL query strings 2204 for the root SDO, all related SDOs 2206, and mapping for each CMP abstract schema name to a SDO meta model type 2208. This information is generated using the definitions defined in the entity beans. The mapping of the abstract schema name is necessary for the EJB mediator to determine the proper SDO to create for each abstract schema name in the query.

As shown in FIG. 22, 'createEmployeeRootMediatorMetaData' 2202 method is generated to create a MediatorMetaData instance. This method will be called the first time a MediatorMetaData is requested for the meta class of the EmployeeRoot SDO. In turn, 'createMediator' method 2210 is implemented on the MediatorMetaData to obtain or create the mediator for the root SDO of the selected data object. In this case, the root for Employee SDO is EmployeeRoot. The MediatorMetaData that is cached for the EmployeeRoot is returned from the createEmployeeRootMediatorMetaData method and a call is later made to create the Mediator.

When 'createMediator' method 2110 is called, the method obtains an EJB mediator factory and makes a call to create a Mediator given defaultQueryShape 2212, rootType 2214 and AbstractSchemaMap 2216. DefaultQueryShape 2212 are query strings 2204 from 'createEmployeeRootMediatorMetaData' method 2202. RootType 2214 is the meta model type for the EmployeeRoot object. AbstractSchemaMap 2216 is a mapping of the abstract schema name of the entity beans to corresponding SDO meta model types for the SDOs. This is the mapping for each CMP abstract schema name to a SDO meta model type 2208 in 'createEmployeeRootMediatorMetaData' method 2202. The update to the database is performed by the mediator itself.

In a preferred embodiment of the present invention, an EJB mediator is used to persist SDOs from a data graph. The EJB mediator can employ various methods for retrieving the data from a data source and persisting data to the data source. For example, in one embodiment, the mediator may convert the EJB QL into structured query language (SQL) statements to be invoked on the database using JDBC calls. Using an EJB mediator has the advantage of being faster and coarser grained than using instances of container managed persistent Entity beans in the EJB container of the application server.

In an alternate embodiment, the EJB mediator can use the meta data and EJB QL queries to read and store the data from and to entity bean instances, using the underlying container managed persistence (CMP) mechanism of the server. This separation of the façade and the mediator provides flexibility in terms of how the actual communication with the underlying data source is performed, while preserving the overall structure and generation pattern of the Session Facade and the SDOs. This is a significant difference between the present invention and the prior art, which always required communication with Entity beans.

Other types of mediator may also be used, as long as it provides a mapping of SDOs to the entity beans and a persistence structure of the SDOs in the data store. An example of other types of mediator includes a JDBC mediator. In the above examples, within the client and the generated façade, no lookup is made for an EJB local home interface to retrieve a local EJB instance and there is no interaction with any entity bean. Thus, there are no changes made to the CMP entity bean class that is otherwise required in known implementations.

In summary, the present invention provides mechanisms for defining a session bean façade, SDOs for a set of one or more related CMP entity beans, and queries for the SDOs. The system will generate a session façade bean that includes methods for operating on a data object graph using the present invention. The present invention has advantages over the prior art in that multiple levels of data objects in a graph, which depicts relationships among data objects, corresponding to relationships in an EJB meta model, may be modeled. In addition, the present invention allows delegation of persistence of SDOs and the query to the mediator. Furthermore, the present invention allows multiple SDOs from multiple CMP entity bean definitions to contribute to a single session bean façade. The service pattern provided by the present invention creates a course grained service for a data object graph, instead of just a single SDO. Moreover, integrity of the inverse relationships between SDOs is maintained.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating a service pattern for an enterprise bean model, wherein the service pattern incorporates service data objects, the method comprising:

detecting a set of definitions in a file, wherein the set of definitions comprises a service data object definition, a query definition, and a session bean facade definition, wherein the service data object definition is defined by a container-managed persistent entity bean using the session bean facade definition;

generating a set of objects in a service pattern based on the set of definitions, wherein the service data object definition is defined by a container-managed persistent entity bean using the session bean facade definition;

detecting a change to the set of definitions, wherein the change to the set of definitions is detected by a changed annotation in a source file that has been defined by the set of definitions;

at development time, updating the service pattern based on the change to the set of definitions; and responsive to receiving a client retrieval request for a service data object in the service pattern, retrieving a mediator from a mediator meta data based on a meta class of a root service data object associated with the client retrieval request, wherein the client retrieval request is handled in accordance with the query definition at runtime using a transformed query object that comprises at least one field from the container-managed persistent entity bean, and wherein the mediator meta data is obtained from a mediator meta data cache, and wherein the mediator obtains the requested service data object from the updated service pattern.

2. The method of claim 1, further comprising obtaining a data graph based on the root service data object by:

retrieving a data graph from the mediator, wherein the mediator executes necessary queries on a data source to build the data graph and wherein the data graph comprises the root service data object for the service data object; and in response to results of executed queries for the service data object being non-empty, obtaining the service data object associated with the client retrieval request from the data graph.

3. The method of claim 1, further comprising:

responsive to receiving a client update request for applying changes to the service data object in the service pattern, obtaining a data graph based on a root service data object for the service data object in the client update request.

4. The method of claim 1, further comprising:

determining whether changes are made to a data graph comprising the service data object; and responsive to determining that changes are made to the data graph, persisting the changes from the data graph to a data store, wherein the determining and the persisting are performed by the mediator.

5. The method of claim 1, wherein the set of objects comprises a session façade bean that includes a method for operating a data graph.

6. The method of claim 1, wherein the set of objects comprises a session bean façade, a service data object, a root service data object, a query service data object, and a combination of the root service data object and the query service data object.

7. The method of claim 1, wherein the client retrieval request is handled at runtime in accordance with a query definition that uses a transformed query object, and wherein the transformed query object comprises at least one field from the container-managed persistent entity bean.

8. The method of claim 1, further comprising:

creating a data graph;

instantiating a new service data object instance;

associating the new service data object instance with the data graph, wherein the data graph includes the new service data object instance; and enabling change recording for the data graph.

9. A data processing system for generating a service data object based service pattern for an enterprise bean model, the data processing system comprising:

a memory;

a computer processor;

detecting means for detecting a set of definitions in a file, wherein the set of definitions comprises a service data object definition, a query definition, and a session bean facade definition, wherein the service data object definition is defined by a container-managed persistent entity bean using the session bean façade definition;

generating means for generating a set of objects in a service pattern based on the set of definitions, wherein the set of objects comprises a session façade bean that includes a method for operating a data graph;

detecting means for detecting a change to the set of definitions, wherein the change to the set of definitions is detected by a changed annotation in a source file that has been defined by the set of definitions;

updating means for, at development time, updating the service pattern based on the change to the set of definitions; and responsive to receiving a client retrieval request for a service data object in the service pattern, first obtaining means for retrieving a mediator from a mediator meta data based on a meta class of a root service data object associated with the client retrieval request, wherein the client retrieval request is handled in accordance with the query definition at runtime using a transformed query object that comprises at least one field from the container-managed persistent entity bean, and wherein the mediator meta data is obtained from a mediator meta data cache, and wherein the mediator obtains the requested service data object from the updated service pattern.

10. The data processing system of claim 9, wherein the mediator executes necessary queries on a data source to build the data graph, and wherein the data processing system further comprises:

first obtaining means for obtaining a service data object associated with the client retrieval request from the data graph.

11. The data processing system of claim 10, further comprising:

second obtaining means for, responsive to receiving a client update request for applying changes to the service data object in the service pattern, obtaining the data graph based on a root service data object for the service data object in the client update request.

12. The data processing system of claim 9, further comprising:

determining means for determining whether changes are made to the data graph comprising the service data object; and persisting means for, responsive to determining whether changes are made to the data graph, persisting the changes from the data graph to a data store, wherein the determining and the persisting are performed by the mediator.

13. The data processing system of claim 9, further comprising:

first creating means for, responsive to a client request for adding a service data object in the service pattern, creating a new instance of the service data object using a client factory.

14. The data processing system of claim 13, further comprising:

second creating means for creating the data graph;

instantiating means for instantiating a new service data object instance;

associating means for associating the new service data object instance with the data graph, wherein the data graph includes the new service data object instance; and enabling means for enabling change recording for the data graph.

15. A computer program product in a computer readable storage medium for generating a service data object based service pattern for an enterprise bean model, the computer program product comprising:

instructions for detecting a set of definitions in a file, wherein the set of definitions comprises a service data object definition, a query definition, and a session bean facade definition, wherein the service data object definition is defined by a container-managed persistent entity bean using the session bean façade definition;

instructions for generating a set of objects in a service pattern based on the set of definitions, wherein the set of objects comprises a session façade bean that includes a method for operating a data graph;

instructions for detecting a change to the set of definitions, wherein the change to the set of definitions is detected by a changed annotation in a source file that has been defined by the set of definitions;

instructions for, at development time, updating the service pattern based on the change to the set of definitions; and instructions for retrieving a mediator from a mediator meta data based on a meta class of a root service data object associated with the client retrieval request, wherein the mediator meta data is obtained from a mediator meta data cache, in response to receiving a client retrieval request for a service data object in the service pattern, wherein the client retrieval request is handled in accordance with the query definition at runtime using a transformed query object that comprises at least one field from the container-managed persistent entity bean, and wherein the mediator meta data is obtained from a mediator meta data cache, and wherein the mediator obtains the requested service data object from the updated service pattern.

16. The computer program product of claim 15, further comprising:

instructions for retrieving the data graph from the mediator, wherein the mediator executes necessary queries on a data source to build the data graph; and instructions for obtaining the service data object in response to receiving a client update request for applying changes to the service data object in the service pattern, wherein the service data object is associated with the client retrieval request from the data graph.

17. The computer program product of claim 16, wherein the instructions for obtaining the service data object further comprise:

instructions for obtaining the data graph based on the root service data object for the service data object in the client update request, wherein obtaining the data graph is in response to receiving a client update request for applying changes to the service data object in the service pattern.

18. The computer program product of claim 15, further comprising:

instructions for determining whether changes are made to the data graph comprising the service data object; and instructions for, responsive to determining whether changes are made to the data graph, persisting the changes from the data graph to a data store, wherein the determining and the persisting are performed by the mediator.

19. The computer program product of claim 15, further comprising:

instructions for creating a new instance of the service data object using a client factory, responsive to client request instructions for adding a service data object in the service pattern.

20. The computer program product of claim 19, further comprising:
    instructions for creating the data graph;
    instructions for instantiating a new service data object instance;
    instructions for associating the new service data object instance with the data graph, wherein the data graph includes the new service data object instance; and
    instructions for enabling change recording for the data graph.

21. A computer implemented method in a data processing system for generating a service data object based service pattern for an enterprise bean model, the computer implemented method comprising:
    detecting a set of definitions in at least one file, wherein the set of definitions includes service data object definitions, query definitions, and a session bean façade definition, and wherein the set of definitions in the at least one file is defined by a client using annotations, wherein the at least one file is one of at least one source file and at least one meta data descriptor file;
    generating a set of objects in a service pattern based on the set of definitions, wherein the set of objects includes a session bean façade, at least one service data object, one of at least one root service data object, at least one query service data object, and a combination of at least one root service data object and at least one query service data object;
    responsive to receiving a client retrieval request for at least one service data object in the service pattern, retrieving a mediator from a mediator meta data based on a meta class of the root service data object associated with the request, wherein the mediator meta data is obtained from a mediator meta data cache;
    retrieving a data graph from the mediator, wherein the mediator executes necessary queries on a data source to build the data graph, and wherein the data graph includes the at least one root service data object for the at least one service data object;
    obtaining the at least one service data object associated with the client retrieval request from the data graph;
    responsive to receiving a client update request for applying changes to the service data object in the service pattern, obtaining the data graph based on the at least one root service data object for the service data object in the client update request;
    determining whether changes are made to the data graph comprising the at least one service data object; and
    responsive to determining that changes are made to the data graph, persisting changes from the data graph to a data store, wherein the determining and the persisting step are performed by the mediator.

* * * * *